US011354688B2

(12) United States Patent
Sunshine et al.

(10) Patent No.: US 11,354,688 B2
(45) Date of Patent: Jun. 7, 2022

(54) SYSTEM AND METHOD FOR PRICING SECONDARY INVENTORY

(71) Applicant: TixTrack, Inc., Santa Monica, CA (US)

(72) Inventors: Steven A. Sunshine, Pasadena, CA (US); Rod Goodman, Long Beach, CA (US); Michael Arya, Pasadena, CA (US); Larry Chu, Van Nuys, CA (US)

(73) Assignee: TixTrack, Inc., Los Angeles, CA (US)

( * ) Notice: Subject to any disclaimer, the term of this patent is extended or adjusted under 35 U.S.C. 154(b) by 101 days.

(21) Appl. No.: 15/804,929

(22) Filed: Nov. 6, 2017

(65) Prior Publication Data

US 2018/0060895 A1 Mar. 1, 2018

Related U.S. Application Data

(63) Continuation-in-part of application No. 14/562,606, filed on Dec. 5, 2014, now abandoned.

(60) Provisional application No. 61/912,850, filed on Dec. 6, 2013.

(51) Int. Cl.
G06Q 30/02 (2012.01)
G06Q 50/10 (2012.01)
G06Q 30/06 (2012.01)
G06Q 10/02 (2012.01)

(52) U.S. Cl.
CPC ......... *G06Q 30/0206* (2013.01); *G06Q 10/02* (2013.01); *G06Q 30/0205* (2013.01); *G06Q 30/0283* (2013.01); *G06Q 30/0601* (2013.01); *G06Q 50/10* (2013.01)

(58) Field of Classification Search
None
See application file for complete search history.

(56) References Cited

U.S. PATENT DOCUMENTS

| | | | | |
|---|---|---|---|---|
| 6,076,070 A * | 6/2000 | Stack | ............... | G06Q 20/201 235/375 |
| 8,577,748 B1 * | 11/2013 | Tobin, Jr. | ............... | G06Q 10/02 705/26.4 |
| 2008/0162211 A1 * | 7/2008 | Addington | ............. | G06Q 40/04 705/14.5 |
| 2009/0216571 A1 * | 8/2009 | Sunshine | ............... | G06Q 10/02 705/5 |
| 2010/0076862 A1 * | 3/2010 | Lefkowitz | ............. | G06Q 10/02 705/26.1 |
| 2012/0173310 A1 * | 7/2012 | Groetzinger | ....... | G06Q 30/0283 705/14.1 |
| 2012/0290339 A1 * | 11/2012 | Sussman | ............... | G06Q 40/04 705/5 |
| 2013/0124234 A1 * | 5/2013 | Nilsson | ................. | G06Q 30/06 705/5 |
| 2013/0282536 A1 * | 10/2013 | Mohazzabfar | ......... | G06Q 50/30 705/30 |
| 2015/0186973 A1 * | 7/2015 | Athimoolam | ...... | G06Q 30/0625 705/26.62 |

OTHER PUBLICATIONS

Pedone, Optimistic validation of electronic tickets, 2001 (Year: 2001).*

* cited by examiner

*Primary Examiner* — Mohamed N El-Bathy
(74) *Attorney, Agent, or Firm* — Richard T. Ogawa; Ogawa P.C.

(57) ABSTRACT

A method for identifying an optimal ticket for purchase and using the optimal ticket to open a venue for a gate of a venue.

10 Claims, 24 Drawing Sheets

Register | Login | My Account | Buy | Sell | Help

Welcome, [Name]! Login My Orders (Not [Name]? Click Here)

1.866.PHONENO

| Sports | Concerts | Theater | Exclusives |

Search [_____] [Find]   Choose Your City >

Sports
MLB Baseball
NBA Basketball
NHL Hockey
NFL Football
NCAA Football
PGA Golf
NASCAR
WWE
UFC
The Masters
Kentucky Derby
MLB All Star Game
All Other Sports

Concerts
Jonas Brothers
Bruce Springsteen
Pearl Jam
Kenny Chesney
Jimmy Buffett
Bon Jovi
R.E.M.
Dave Matthews
Billy Joel
Kanye West
George Michael
Tom Petty
Counting Crows and Maroon 5
Jay-Z
The Police
Michael Buble
Eagles
Eric Clapton
Alicia Keys
Elton John
All Other Concerts

Theater
Broadway Shows
Comedy Shows
Cirque Du Soleil
Classical Music & Opera
Family Shows
All Other Theater

Exclusives
TV Show Tapings
All Other Exclusives

Current Events

Resource Center
› How it Works
› About
› Help

Advertisement

Advertisement

Advertisement

Newsletter

[Select your city]
(Sign Up)

Testimonials

FIGURE 1A

Welcome to Ticket Seller!

| Team vs. Team Ticket Banner | |
|---|---|
| Team 1 | Team 2 |
| GET TICKETS ▷ | GET TICKETS ▷ |

This Week's Top Tickets    Celtics Playoff Tickets, NHL Playoffs, NCAA, Frozen Four MLB: Red Sox, Yankees, Mets, Cubs, Phillies, Tigers, Dodgers, Cardinals, Giants NBA: Celtics, Lakers, Warriors, Cavaliers, Suns, Knicks, Pistons, Mavs, Rockets NHL: Rangers, Flyers, Devils, Capitals, Sharks, Red Wings, Penguins, Bruins Concerts: James Taylor, Rush, Radiohead, Iron Maiden, Tim McGraw, Keith Urban

Ticket Finder

1. [Pick a category]
2. [Choose a location]
3. [# of tickets]

(Find)

Advertisement

Advertisement

Advertisement

All Tickets

- Concert Tickets
  - Artists A - C
  - Artists D - G
  - Artists H - K
  - Artists L - O
  - Artists P - S
  - Artists T - Z
  - Upcoming Concert Tours

- Sports Tickets
  - Baseball Tickets
  - Basketball Tickets
  - Bodybuilding Tickets
  - Eating Competition Tickets
  - Fight Tickets (Boxing, UFC)
  - Figure Skating Tickets
  - Football Tickets
  - Golf Tickets
  - Gynamistics Tickets
  - Hockey Tickets
  - Horse Racing Tickets
  - Lacrosse Tickets
  - Motorsports Tickets
  - Rodeo Tickets
  - Rugby Tickets
  - Soccer Tickets
  - Softball Tickets
  - Swimming Tickets
  - Tennis Tickets
  - Track and Field Tickets
  - Volleyball Tickets
  - Wrestling Tickets

- Theater Tickets and Arts Tickets
  - Broadway Tickets and National Tours Tickets
  - Cirque Du Soleil Tickets
  - Classical Music and Opera Tickets
  - Comedy Tickets
  - Dance / Ballet Tickets
  - Family Tickets
  - Movie Event Tickets
  - Speaking Tour / Convention Tickets
  - TV Show Tickets

FIGURE 1B

| Section | Row | Quantity | Price | Ticket ID | Premium |
|---|---|---|---|---|---|
| 101 | 14 | 2 | $225 | 111264898 | 0.5517 |
| 101 | 6 | 2 | $350 | 122411482 | 1.4138 |
| 119 | 15 | 2 | $212 | 123606457 | 0.462 |
| 112 | 1 | 2 | $267 | 123283598 | 0.8414 |
| 112 | B | 4 | $600 | 101687128 | 0.2 |
| 117 | 15 | 2 | $150 | 120553126 | 1.14 |
| 105 | 7 | 4 | $175 | 120565922 | 1.5 |
| 107 | 15 | 4 | $134 | 123188561 | 0.411 |
| PR9 | 6 | 7 | $150 | 112311165 | 0.579 |
| PR15 | 9 | 2 | $150 | 124589629 | 0.304 |
| 216 | 11 | 4 | $78 | 117978601 | 1.3 |
| 302 | 7 | 4 | $67 | 124140047 | 1.68 |
| 310 | 3 | 3 | $50 | 120905060 | 1.5 |
| 311 | 6 | 2 | $55 | 112792943 | 2.67 |
| 318 | 1 | 2 | $126 | 120754499 | 2.4 |
| 326 | 6 | 1 | $50 | 124594171 | 2.33 |
| 327 | 5 | 2 | $49 | 122097908 | 1.45 |
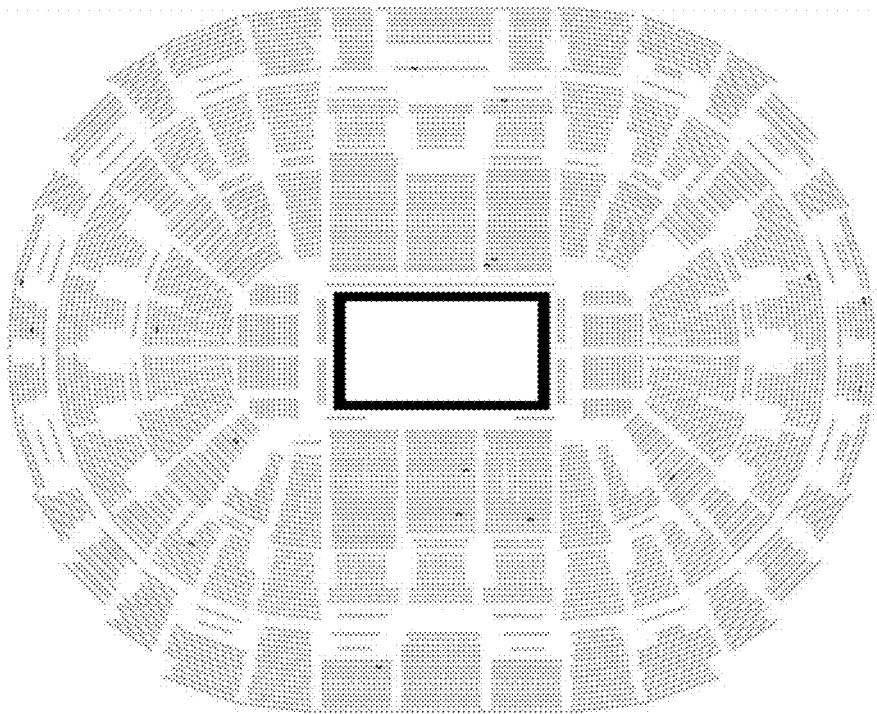
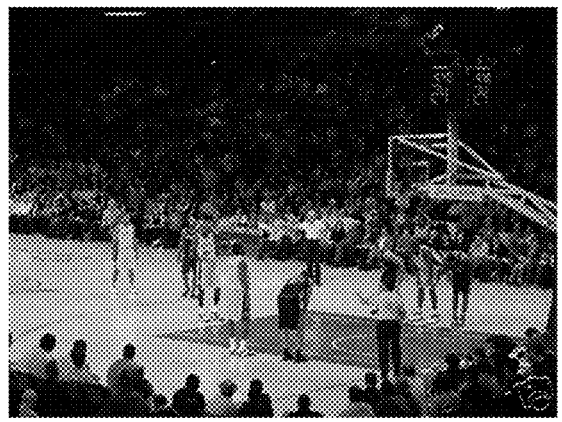
FIGURE 5

What is the most important criteria for your ticket selection?

☐ Cost (Lowest price ticket possible)

☐ Value (Lowest price ticket for the location)

☐ Closeness to the event (Near the action)

How much do you want to pay for your ticket?

☐ <$25

☐ $25-35

☐ $35-$50

☐ $50-$75

☐ >$75

Ticket Attributes (Please Mark Importance 1=low, 10=high)

|  | 1 | 2 | 3 | 4 | 5 | 6 | 7 | 8 | 9 | 10 |
|---|---|---|---|---|---|---|---|---|---|---|
| Price | ☐ | ☐ | ☐ | ☐ | ☐ | ☐ | ☐ | ☐ | ☐ | ☐ |
| Value | ☐ | ☐ | ☐ | ☐ | ☐ | ☐ | ☐ | ☐ | ☐ | ☐ |
| Location | ☐ | ☐ | ☐ | ☐ | ☐ | ☐ | ☐ | ☐ | ☐ | ☐ |

FIGURE 6

```
<!DOCTYPE html
   PUBLIC "-//W3C//DTD XHTML 1.0 Transitional//EN"
"http://www.w3.org/TR/xhtml1/DTD/xhtml1-transitional.dtd">
<html xmlns:xs="http://www.w3.org/2001/XMLSchema"><head><title>Los
Angeles Clippers vs Los Angeles Lakers [4/10/2008] at
StubHub!</title><meta name="description" content="Clippers - Lakers
Tickets - Buy and sell Los Angeles Clippers vs Los Angeles Lakers
Tickets for April 10 at STAPLES Center in Los Angeles,CA at
StubHub!"/><meta name="keywords" content="Clippers,Lakers,Los Angeles
,Los Angeles Clippers,Los Angeles Lakers,STAPLES Center,4/10/2008,April
10,Los Angeles Clippers vs"/><meta name="robots" content="index,
follow"/><meta name="googlebot" content="index, follow"/><meta
content="application/xhtml+xml; charset=utf-8" http-equiv="Content-
Type"/><meta content="en" http-equiv="Content-Language"/><meta
content="text/javascript" http-equiv="Content-Script-Type"/><meta
content="text/css" http-equiv="Content-Style-Type"/><meta
content="StubHub, Inc." name="Author"/><meta content="Copyright 2000-
2005 StubHub, Inc.  All rights reserved. StubHub, HubBub and Ticket
Design are trademarks of StubHub, Inc., used under license."
name="Copyright"/><meta http-equiv="pragma" content="no-cache"/><!--
srcId:browse|browseEventView--><link rel="icon" href="/favicon.ico"
type="image/x-icon"/><link rel="shortcut icon" href="/favicon.ico"
type="image/x-icon"/><link type="text/css" rel="stylesheet"
href="/resources/css/www.css"/><link type="text/css" rel="stylesheet"
href="/resources/css/peccary.css"/>
<!--[if IE]><link rel="stylesheet" type="text/css"
href="/resources/css/peccary_ie.css"/><![endif]-->
<!--[if lte IE 6]><link rel="stylesheet" type="text/css"
href="/resources/css/peccary_ie_six.css"/><![endif]--><base
target="_top"/><script type="text/javascript"> isFlashMap = true;
                        </script><script type="text/javascript"
src="/jsrs/peccary3.js">Â </script><script type="text/vbscript"
src="/jsrs/flashdetect.vbs">Â </script><script type="text/javascript"
src="/jsrs/FlashGateway.js">Â </script><script type="text/javascript">
                                        if(!flashDetect(8)){ window.location.href="/?event_id=441482&flash=0&flash8=1"
                                        } if (!isDefined('qsObj')) { qsObj =
new Array(); }
                                        qsObj['cobrand'] = 47;
                                        qsObj['xbid'] =4981;
                                        qsObj['eventid'] =441482;
                                        qsObj['offset'] = 1;
                                            qsObj['limit'] = 80;
                                        qsObj['geo'] = 'staples-center-
tickets';
                                            qsObj['genre'] = 'los-
angeles-clippers-tickets';
                                        urlstring = '/';
```

FIGURE 9

| Section | Row | Quantity | Price | TicketID |
|---|---|---|---|---|
| 327 | 5 | 2 | 49 | 122097908 |
| 310 | 3 | 3 | 49.99 | 120905060 |
| 326 | 6 | 1 | 50 | 124594171 |
| 314 | 7 | 2 | 52 | 110885674 |
| 311 | 6 | 2 | 55 | 112792943 |
| 326 | 2 | 3 | 59.99 | 123027712 |
| 326 | 2 | 2 | 62 | 124592096 |
| 325 | 2 | 4 | 62 | 124592095 |
| 328 | 2 | 4 | 62 | 124592097 |
| 309 | 1 | 3 | 63 | 120752916 |
| 311 | 1 | 3 | 63 | 120752917 |
| 309 | 4 | 6 | 63 | 123723063 |
| 328 | 7 | 2 | 65 | 104665262 |
| 326 | 7 | 4 | 65 | 111672661 |
| 309 | 7 | 4 | 65 | 121144372 |
| 325 | 7 | 8 | 65 | 123033959 |
| 302 | 7 | 4 | 67 | 124140047 |
| 328 | 1 | 5 | 68 | 120752919 |
| 304 | 7 | 10 | 69 | 124291457 |
| 318 | 12 | 4 | 70 | 124096616 |
| 325 | 6 | 8 | 70 | 123224005 |
| 320 | 9 | 11 | 71 | 120577898 |
| 316 | 11 | 11 | 71 | 120577894 |
| 318 | 8 | 2 | 75 | 118041578 |
| 318 | 8 | 2 | 75 | 118041579 |
| 310 | 1 | 2 | 75 | 124291458 |
| 325 | 1 | 2 | 75 | 124291460 |
| 330 | 1 | 6 | 75 | 120752920 |
| 311 | 1 | 9 | 75 | 124291459 |

FIGURE 11

| Section | Row | Quantity | UP TO | Price | PriceSTH | TicketID | Premium |
|---|---|---|---|---|---|---|---|
| 327 | 5 | 2 | 0 | 49 | 20 | 122097908 | 1.45 |
| 310 | 3 | 3 | 0 | 49.99 | 20 | 120905060 | 1.4995 |
| 326 | 6 | 1 | 0 | 50 | 15 | 124594171 | 2.333333 |
| 314 | 7 | 2 | 0 | 52 | 20 | 110885674 | 1.6 |
| 311 | 6 | 2 | 0 | 55 | 15 | 112792943 | 2.666667 |
| 326 | 2 | 3 | 1 | 59.99 | 20 | 123027712 | 1.9995 |
| 326 | 2 | 2 | 0 | 62 | 20 | 124592096 | 2.1 |
| 325 | 2 | 4 | 1 | 62 | 20 | 124592095 | 2.1 |
| 328 | 2 | 4 | 1 | 62 | 20 | 124592097 | 2.1 |
| 309 | 1 | 3 | 1 | 63 | 20 | 120752916 | 2.15 |
| 311 | 1 | 3 | 0 | 63 | 20 | 120752917 | 2.15 |
| 309 | 4 | 6 | 1 | 63 | 20 | 123723063 | 2.15 |
| 328 | 7 | 2 | 0 | 65 | 15 | 104665262 | 3.333333 |
| 326 | 7 | 4 | 1 | 65 | 15 | 111672661 | 3.333333 |
| 309 | 7 | 4 | 0 | 65 | 15 | 121144372 | 3.333333 |
| 325 | 7 | 8 | 1 | 65 | 15 | 123033959 | 3.333333 |
| 302 | 7 | 4 | 1 | 67 | 25 | 124140047 | 1.68 |
| 328 | 1 | 5 | 1 | 68 | 20 | 120752919 | 2.4 |
| 304 | 7 | 10 | 1 | 69 | 20 | 124291457 | 2.45 |
| 318 | 12 | 4 | 1 | 70 | 25 | 124096616 | 1.8 |
| 325 | 6 | 8 | 1 | 70 | 15 | 123224005 | 3.666667 |
| 320 | 9 | 11 | 1 | 71 | 25 | 120577898 | 1.84 |
| 316 | 11 | 11 | 1 | 71 | 25 | 120577894 | 1.84 |
| 318 | 8 | 2 | 0 | 75 | 25 | 118041578 | 2 |
| 318 | 8 | 2 | 0 | 75 | 25 | 118041579 | 2 |
| 310 | 1 | 2 | 0 | 75 | 20 | 124291458 | 2.75 |
| 325 | 1 | 2 | 0 | 75 | 20 | 124291460 | 2.75 |
| 330 | 1 | 6 | 1 | 75 | 20 | 120752920 | 2.75 |
| 311 | 1 | 9 | 1 | 75 | 20 | 124291459 | 2.75 |

FIGURE 12

| Section | Row | Quantity | UP TO | Price | PriceSTH | TicketID | Premium |
|---|---|---|---|---|---|---|---|
| 101 | 14 | 2 | 0 | 225 | 145 | 111264898 | 0.551724 |
| 101 | 13 | 4 | 1 | 300 | 145 | 108269937 | 1.068966 |
| 101 | 13 | 2 | 0 | 325 | 145 | 114086090 | 1.241379 |
| 101 | 9 | 2 | 0 | 325 | 145 | 119741575 | 1.241379 |
| 101 | 6 | 2 | 0 | 350 | 145 | 122411482 | 1.413793 |
| 101 | 5 | 6 | 1 | 412 | 145 | 124587460 | 1.841379 |
| 101 | 11 | 2 | 0 | 442 | 145 | 118843228 | 2.048276 |
| 101 | 5 | 4 | 1 | 458 | 145 | 124291443 | 2.158621 |
| 101 | 3 | 2 | 0 | 498 | 145 | 124291442 | 2.434483 |
| 101 | 2 | 4 | 1 | 498 | 145 | 124291441 | 2.434483 |
| 101 | 4 | 4 | 1 | 568 | 145 | 121387771 | 2.917241 |
| 101 | 1 | 2 | 0 | 800 | 145 | 109739602 | 4.517241 |

FIGURE 13

| Section | Row | Quantity | Price | PriceSTH | TicketID | Premium | Value |
|---|---|---|---|---|---|---|---|
| 101 | 14 | 2 | 225 | 145 | 111264898 | 55.17% | 0.20 |
| 101 | 13 | 4 | 300 | 145 | 108269937 | 106.90% | -0.14 |
| 101 | 13 | 2 | 325 | 145 | 114086090 | 124.14% | -0.31 |
| 101 | 9 | 2 | 325 | 145 | 119741575 | 124.14% | 0.42 |
| 101 | 6 | 2 | 350 | 145 | 122411482 | 141.38% | 0.79 |
| 101 | 5 | 6 | 412 | 145 | 124587460 | 184.14% | 0.54 |
| 101 | 11 | 2 | 442 | 145 | 118843228 | 204.83% | -0.75 |
| 101 | 5 | 4 | 458 | 145 | 124291443 | 215.86% | 0.22 |
| 101 | 3 | 2 | 498 | 145 | 124291442 | 243.45% | 0.31 |
| 101 | 2 | 4 | 498 | 145 | 124291441 | 243.45% | 0.49 |
| 101 | 4 | 4 | 568 | 145 | 121387771 | 291.72% | -0.35 |
| 101 | 1 | 2 | 800 | 145 | 109739602 | 451.72% | -1.41 |

| Section | Row | Price | PriceSTH | TicketID | Premium |
|---|---|---|---|---|---|
| 119 | 15 | 212 | 145 | 123606457 | 0.462069 |
| 119 | 16 | 220 | 145 | 118546416 | 0.517241 |
| 101 | 14 | 225 | 145 | 111264898 | 0.551724 |
| 102 | 10 | 225 | 145 | 119863832 | 0.551724 |
| 112 | 16 | 230 | 145 | 121981335 | 0.586207 |
| 119 | 6 | 235 | 145 | 116846662 | 0.62069 |
| 102 | 13 | 240 | 145 | 113916049 | 0.655172 |
| 112 | 19 | 245 | 145 | 112675586 | 0.689655 |
| 119 | 19 | 245 | 145 | 112675546 | 0.689655 |
| 119 | 5 | 250 | 145 | 106870905 | 0.724138 |
| 119 | 19 | 255 | 145 | 109739550 | 0.758621 |
| 112 | 3 | 263 | 145 | 109361096 | 0.813793 |
| 112 | 4 | 263 | 145 | 109361097 | 0.813793 |
| 112 | 1 | 267 | 145 | 123283598 | 0.841379 |
| 102 | 6 | 289 | 145 | 119390368 | 0.993103 |
| 110 | 19 | 295 | 145 | 124587461 | 1.034483 |
| 101 | 13 | 300 | 145 | 108269937 | 1.068966 |
| 110 | 1 | 300 | 145 | 105525882 | 1.068966 |
| 102 | 19 | 303 | 145 | 123669245 | 1.089655 |
| 102 | 19 | 310 | 145 | 122897436 | 1.137931 |
| 101 | 13 | 325 | 145 | 114086090 | 1.241379 |
| 101 | 9 | 325 | 145 | 119741575 | 1.241379 |
| 101 | 6 | 350 | 145 | 122411482 | 1.413793 |
| 110 | 15 | 350 | 145 | 123179636 | 1.413793 |
| 112 | 5 | 355 | 145 | 124291450 | 1.448276 |
| 112 | 3 | 383 | 145 | 114094659 | 1.641379 |
| 111 | 2 | 389 | 145 | 124592073 | 1.682759 |
| 111 | 10 | 400 | 145 | 106306525 | 1.758621 |
| 112 | 9 | 400 | 145 | 109860958 | 1.758621 |
| 119 | 10 | 406 | 145 | 120814854 | 1.8 |
| 101 | 5 | 412 | 145 | 124587460 | 1.841379 |
| 102 | 5 | 412 | 145 | 124291444 | 1.841379 |
| 111 | 7 | 412 | 145 | 124291447 | 1.841379 |
| 111 | 7 | 412 | 145 | 124326949 | 1.841379 |
| 111 | 10 | 412 | 145 | 124291448 | 1.841379 |
| 112 | 1 | 412 | 145 | 124291449 | 1.841379 |
| 119 | 2 | 412 | 145 | 124291454 | 1.841379 |
| 119 | 3 | 412 | 145 | 124291455 | 1.841379 |
| 111 | 3 | 430 | 145 | 124326948 | 1.965517 |
| 111 | 4 | 430 | 145 | 124623228 | 1.965517 |
| 119 | 14 | 433 | 145 | 114794673 | 1.986207 |
| 119 | 13 | 433 | 145 | 114794672 | 1.986207 |
| 101 | 11 | 442 | 145 | 118843228 | 2.048276 |
| 111 | 14 | 442 | 145 | 122228596 | 2.048276 |
| 110 | 6 | 450 | 145 | 121488635 | 2.103448 |
| 101 | 5 | 458 | 145 | 124291443 | 2.158621 |
| 111 | 4 | 458 | 145 | 124291446 | 2.158621 |
| 111 | 13 | 460 | 145 | 121387773 | 2.172414 |
| 102 | 1 | 465 | 145 | 124623227 | 2.206897 |
| 102 | 6 | 487 | 145 | 120577290 | 2.358621 |
| 101 | 3 | 498 | 145 | 124291442 | 2.434483 |
| 101 | 2 | 498 | 145 | 124291441 | 2.434483 |
| 111 | 9 | 514 | 145 | 121611254 | 2.544828 |
| 119 | 3 | 541 | 145 | 120577298 | 2.731034 |
| 111 | 1 | 550 | 145 | 109187407 | 2.793103 |
| 119 | 2 | 550 | 145 | 109978803 | 2.793103 |
| 111 | 1 | 559 | 145 | 122228595 | 2.855172 |
| 101 | 4 | 568 | 145 | 121387771 | 2.917241 |
| 110 | 13 | 599.99 | 145 | 122059513 | 3.137862 |
| 111 | 1 | 676 | 145 | 121387772 | 3.662069 |
| 101 | 1 | 800 | 145 | 109739602 | 4.517241 |
| 102 | 1 | 800 | 145 | 109495309 | 4.517241 |

FIGURE 15

| Section | Row | Quantity | UP TO | Price | PriceSTH | TicketID | Premium | Section | Value |
|---|---|---|---|---|---|---|---|---|---|
| 101 | 14 | 2 | 0 | 225 | 145 | 111264898 | 0.551724 | 1.00 | 1.036716 |
| 101 | 13 | 4 | 1 | 300 | 145 | 108269937 | 1.068966 | 1.00 | 0.590834 |
| 101 | 13 | 2 | 0 | 325 | 145 | 114086090 | 1.241379 | 1.00 | 0.418421 |
| 101 | 9 | 2 | 0 | 325 | 145 | 119741575 | 1.241379 | 1.00 | 0.703861 |
| 101 | 6 | 2 | 0 | 350 | 145 | 122411482 | 1.413793 | 1.00 | 0.745527 |
| 101 | 5 | 6 | 1 | 412 | 145 | 124587460 | 1.841379 | 1.00 | 0.389301 |
| 101 | 11 | 2 | 0 | 442 | 145 | 118843228 | 2.048276 | 1.00 | -0.245756 |
| 101 | 5 | 4 | 1 | 458 | 145 | 124291443 | 2.158621 | 1.00 | 0.072059 |
| 101 | 3 | 2 | 0 | 498 | 145 | 124291442 | 2.434483 | 1.00 | -0.061083 |
| 101 | 2 | 4 | 1 | 498 | 145 | 124291441 | 2.434483 | 1.00 | 0.010277 |
| 101 | 4 | 4 | 1 | 568 | 145 | 121387771 | 2.917241 | 1.00 | -0.615201 |
| 101 | 1 | 2 | 0 | 800 | 145 | 109739602 | 4.517241 | 1.00 | -2.001121 |
| 102 | 10 | 2 | 0 | 225 | 145 | 119863832 | 0.551724 | 2.00 | 0.853436 |
| 102 | 13 | 2 | 0 | 240 | 145 | 113916049 | 0.655172 | 2.00 | 0.535908 |
| 102 | 6 | 2 | 0 | 289 | 145 | 119390368 | 0.993103 | 2.00 | 0.697497 |
| 102 | 19 | 2 | 0 | 303 | 145 | 123669245 | 1.089655 | 2.00 | -0.326735 |
| 102 | 19 | 4 | 1 | 310 | 145 | 122897436 | 1.137931 | 2.00 | -0.375011 |
| 102 | 5 | 6 | 1 | 412 | 145 | 124291444 | 1.841379 | 2.00 | -0.079419 |
| 102 | 1 | 2 | 0 | 465 | 145 | 124623227 | 2.206897 | 2.00 | -0.159497 |
| 102 | 6 | 4 | 1 | 487 | 145 | 120577290 | 2.358621 | 2.00 | -0.668021 |
| 102 | 1 | 2 | 0 | 800 | 145 | 109495309 | 4.517241 | 2.00 | -2.469841 |
| 110 | 19 | 2 | 0 | 295 | 145 | 124587461 | 1.034483 | 2.00 | -0.271563 |
| 110 | 1 | 2 | 0 | 300 | 145 | 105525882 | 1.068966 | 2.00 | 0.978434 |
| 110 | 15 | 2 | 0 | 350 | 145 | 123179636 | 1.413793 | 2.00 | -0.365433 |
| 110 | 6 | 2 | 0 | 450 | 145 | 121488635 | 2.103448 | 2.00 | -0.412848 |
| 110 | 13 | 2 | 0 | 599.99 | 145 | 122059513 | 3.137862 | 2.00 | -1.946782 |
| 111 | 2 | 2 | 0 | 389 | 145 | 124592073 | 1.682759 | 1.00 | 0.762001 |
| 111 | 10 | 2 | 0 | 400 | 145 | 106306525 | 1.758621 | 1.00 | 0.115259 |
| 111 | 7 | 2 | 0 | 412 | 145 | 124291447 | 1.841379 | 1.00 | 0.246581 |
| 111 | 7 | 2 | 0 | 412 | 145 | 124326949 | 1.841379 | 1.00 | 0.246581 |
| 111 | 10 | 4 | 1 | 412 | 145 | 124291448 | 1.841379 | 1.00 | 0.032501 |
| 111 | 3 | 2 | 0 | 430 | 145 | 124326948 | 1.965517 | 1.00 | 0.407883 |
| 111 | 4 | 2 | 0 | 430 | 145 | 124623228 | 1.965517 | 1.00 | 0.336523 |
| 111 | 14 | 2 | 0 | 442 | 145 | 122228596 | 2.048276 | 1.00 | -0.459836 |
| 111 | 4 | 6 | 1 | 458 | 145 | 124291446 | 2.158621 | 1.00 | 0.143419 |
| 111 | 13 | 4 | 1 | 460 | 145 | 121387773 | 2.172414 | 1.00 | -0.512614 |
| 111 | 9 | 2 | 0 | 514 | 145 | 121611254 | 2.544828 | 1.00 | -0.599588 |
| 111 | 1 | 2 | 0 | 550 | 145 | 109187407 | 2.793103 | 1.00 | -0.276983 |
| 111 | 1 | 1 | 0 | 559 | 145 | 122228595 | 2.855172 | 1.00 | -0.339052 |
| 111 | 1 | 2 | 0 | 676 | 145 | 121387772 | 3.662069 | 1.00 | -1.145949 |
| 112 | 16 | 3 | 0 | 230 | 145 | 121981335 | 0.586207 | 2.00 | 0.390793 |
| 112 | 19 | 4 | 1 | 245 | 145 | 112675586 | 0.689655 | 2.00 | 0.073265 |
| 112 | 3 | 2 | 0 | 263 | 145 | 109361096 | 0.813793 | 2.00 | 1.090887 |
| 112 | 4 | 2 | 0 | 263 | 145 | 109361097 | 0.813793 | 2.00 | 1.019527 |
| 112 | 1 | 2 | 0 | 267 | 145 | 123283598 | 0.841379 | 2.00 | 1.206021 |
| 112 | 5 | 2 | 0 | 355 | 145 | 124291450 | 1.448276 | 2.00 | 0.313684 |
| 112 | 3 | 2 | 0 | 383 | 145 | 114094659 | 1.641379 | 2.00 | 0.263301 |
| 112 | 9 | 2 | 0 | 400 | 145 | 109860958 | 1.758621 | 2.00 | -0.282101 |
| 112 | 1 | 2 | 0 | 412 | 145 | 124291449 | 1.841379 | 2.00 | 0.206021 |
| 119 | 15 | 2 | 0 | 212 | 145 | 123606457 | 0.462069 | 2.00 | 0.586291 |
| 119 | 16 | 4 | 1 | 220 | 145 | 118546416 | 0.517241 | 2.00 | 0.459759 |
| 119 | 6 | 2 | 0 | 235 | 145 | 116846662 | 0.62069 | 2.00 | 1.06991 |
| 119 | 19 | 4 | 1 | 245 | 145 | 112675546 | 0.689655 | 2.00 | 0.073265 |
| 119 | 5 | 2 | 0 | 250 | 145 | 106870905 | 0.724138 | 2.00 | 1.037822 |
| 119 | 19 | 2 | 0 | 255 | 145 | 109739550 | 0.758621 | 2.00 | 0.004299 |
| 119 | 10 | 4 | 1 | 406 | 145 | 120814854 | 1.8 | 2.00 | -0.39484 |
| 119 | 2 | 2 | 0 | 412 | 145 | 124291454 | 1.841379 | 2.00 | 0.134661 |
| 119 | 3 | 4 | 1 | 412 | 145 | 124291455 | 1.841379 | 2.00 | 0.063301 |
| 119 | 14 | 4 | 1 | 433 | 145 | 114794673 | 1.986207 | 2.00 | -0.866487 |
| 119 | 13 | 4 | 1 | 433 | 145 | 114794672 | 1.986207 | 2.00 | -0.795127 |
| 119 | 3 | 2 | 0 | 541 | 145 | 120577298 | 2.731034 | 2.00 | -0.826354 |
| 119 | 2 | 1 | 0 | 550 | 145 | 109978803 | 2.793103 | 2.00 | -0.817063 |

FIGURE 17

| Section | Row | Quantity | UP TO | Price | PriceSTH | TicketID | Premium |
|---|---|---|---|---|---|---|---|
| 308 | 7 | 6 | 1 | 91 | 15 | 107312032 | 5.066667 |
| 308 | 6 | 8 | 1 | 99 | 15 | 105754346 | 5.6 |
| 309 | 7 | 4 | 0 | 65 | 15 | 121144372 | 3.333333 |
| 311 | 6 | 2 | 0 | 55 | 15 | 112792943 | 2.666667 |
| 311 | 7 | 8 | 1 | 99 | 15 | 105751818 | 5.6 |
| 325 | 7 | 8 | 1 | 65 | 15 | 123033959 | 3.333333 |
| 325 | 6 | 8 | 1 | 70 | 15 | 123224005 | 3.666667 |
| 325 | 6 | 8 | 1 | 99 | 15 | 105751819 | 5.6 |
| 325 | 6 | 8 | 1 | 100 | 15 | 123226428 | 5.666667 |
| 326 | 6 | 1 | 0 | 50 | 15 | 124594171 | 2.333333 |
| 326 | 7 | 4 | 1 | 65 | 15 | 111672661 | 3.333333 |
| 328 | 7 | 2 | 0 | 65 | 15 | 104665262 | 3.333333 |

| Section | Row | Quantity | UP TO | Price | PriceSTH | TicketID | Premium |
|---|---|---|---|---|---|---|---|
| 304 | 7 | 10 | 1 | 69 | 20 | 124291457 | 2.45 |
| 309 | 1 | 3 | 1 | 63 | 20 | 120752916 | 2.15 |
| 309 | 4 | 6 | 1 | 63 | 20 | 123723063 | 2.15 |
| 309 | 5 | 8 | 1 | 100 | 20 | 123224019 | 4 |
| 309 | 2 | 2 | 0 | 250 | 20 | 103430280 | 11.5 |
| 310 | 3 | 3 | 0 | 49.99 | 20 | 120905060 | 1.4995 |
| 310 | 1 | 2 | 0 | 75 | 20 | 124291458 | 2.75 |
| 311 | 1 | 3 | 0 | 63 | 20 | 120752917 | 2.15 |
| 311 | 1 | 9 | 1 | 75 | 20 | 124291459 | 2.75 |
| 314 | 7 | 2 | 0 | 52 | 20 | 110885674 | 1.6 |
| 315 | 9 | 4 | 1 | 85 | 20 | 107696050 | 3.25 |
| 325 | 2 | 4 | 1 | 62 | 20 | 124592095 | 2.1 |
| 325 | 1 | 2 | 0 | 75 | 20 | 124291460 | 2.75 |
| 326 | 2 | 3 | 1 | 59.99 | 20 | 123027712 | 1.9995 |
| 326 | 2 | 2 | 0 | 62 | 20 | 124592096 | 2.1 |
| 327 | 5 | 2 | 0 | 49 | 20 | 122097908 | 1.45 |
| 328 | 2 | 4 | 1 | 62 | 20 | 124592097 | 2.1 |
| 328 | 1 | 5 | 1 | 68 | 20 | 120752919 | 2.4 |
| 328 | 3 | 2 | 0 | 80 | 20 | 119943242 | 3 |
| 330 | 1 | 6 | 1 | 75 | 20 | 120752920 | 2.75 |
| 331 | 1 | 8 | 1 | 101 | 20 | 118654538 | 4.05 |
| 332 | 10 | 16 | 1 | 89 | 20 | 123965594 | 3.45 |
| 332 | 11 | 24 | 1 | 89 | 20 | 123965595 | 3.45 |

FIGURE 18

| Section | Row | Quantity | UP TO | Price | PriceSTH | TicketID | Premium |
|---|---|---|---|---|---|---|---|
| 104 | 14 | 4 | 1 | 175 | 70 | 120565955 | 1.5 |
| 104 | 12 | 2 | 0 | 180 | 70 | 120565838 | 1.571429 |
| 104 | 12 | 2 | 0 | 190 | 70 | 120567270 | 1.714286 |
| 104 | 16 | 2 | 0 | 200 | 70 | 106077349 | 1.857143 |
| 105 | 18 | 6 | 1 | 164.99 | 70 | 116801334 | 1.357 |
| 105 | 10 | 2 | 0 | 170 | 70 | 120567230 | 1.428571 |
| 105 | 7 | 4 | 1 | 175 | 70 | 120565922 | 1.5 |
| 105 | 15 | 2 | 0 | 212 | 70 | 122139649 | 2.028571 |
| 105 | 11 | 2 | 0 | 249 | 70 | 107347110 | 2.557143 |
| 105 | 17 | 2 | 0 | 250 | 70 | 110001615 | 2.571429 |
| 105 | 8 | 2 | 0 | 260 | 70 | 122505289 | 2.714286 |
| 105 | 11 | 2 | 0 | 265 | 70 | 122228593 | 2.785714 |
| 105 | 17 | 2 | 0 | 500 | 70 | 115795348 | 6.142857 |
| 108 | 18 | 2 | 0 | 180 | 70 | 115375094 | 1.571429 |
| 108 | 17 | 4 | 1 | 201 | 70 | 124291445 | 1.871429 |
| 108 | 18 | 4 | 1 | 212 | 70 | 122135106 | 2.028571 |
| 108 | 6 | 2 | 0 | 240 | 70 | 106840999 | 2.428571 |
| 108 | 9 | 4 | 1 | 244 | 70 | 120577293 | 2.485714 |
| 108 | 6 | 2 | 0 | 265 | 70 | 122228594 | 2.785714 |
| 108 | 9 | 4 | 1 | 282 | 70 | 124165611 | 3.028571 |
| 114 | 19 | 2 | 0 | 150 | 70 | 123178841 | 1.142857 |
| 114 | 14 | 2 | 0 | 183 | 70 | 121832066 | 1.614286 |
| 114 | 14 | 2 | 0 | 200 | 70 | 112618668 | 1.857143 |
| 114 | 18 | 2 | 0 | 212 | 70 | 122135107 | 2.028571 |
| 114 | 7 | 2 | 0 | 275 | 70 | 120869010 | 2.928571 |
| 117 | 15 | 2 | 0 | 150 | 70 | 120553126 | 1.142857 |
| 117 | 20 | 2 | 0 | 160 | 70 | 109186548 | 1.285714 |
| 117 | 19 | 2 | 0 | 165 | 70 | 117997928 | 1.357143 |
| 117 | 16 | 4 | 1 | 212 | 70 | 122135113 | 2.028571 |
| 117 | 15 | 4 | 0 | 360 | 70 | 120443783 | 4.142857 |

FIGURE 19

Ticket Finder Website

Home >
Affiliate Program: How It Works

Existing Affiliates - Login
Affiliate ID:

Password:          [Go]

[Lost Password]

Ticket Finder Website Affiliate Program

Website is currently the largest online fan-to-fan ticket marketplace, where more fans buy & sell tickets to live national events than anywhere else. As Website's popularity grows, our site traffic continues to escalate.

Benefit from our growth by letting the Website Affiliate Program pay you a commission every time someone buys through your links.

Sign up today and earn 8% of confirmed purchase.

How the Program Works

1. Affiliates drive traffic to Website through specially formatted links that allow us to track all transactions and other activity.
2. Affiliates earn 8% for every confirmed purchase.
3. Website sends payments to Affiliates on a monthly basis.

Once you join the program, we will give you access to the Affiliate Hub, our extranet exclusive to our Affiliates. From here, you can build links, view your traffic and earnings reports, and read about the latest news and opportunities available to you through the Website Affiliate Program.

Participation is Easy and Free

1. Complete the online application.
2. Create & post your links to Website.com using our "Get Links" tool in the Affiliates Hub.
3. Begin tracking your traffic and earnings reports online. Reports are updated daily.

- Tickets
- Sports Tickets
- Concert Tickets
- Theater Tickets
- Broadway Tickets
- Exclusive Tickets
  - MLB Tickets
  - NBA Tickets
  - NHL Tickets
  - NFL Tickets
  - Soccer Tickets Have questions about how to buy tickets or sell tickets? Email or call us toll free at 866.PHONENO(866.555.5555). Customer service will help you buy tickets or sell tickets from 5:00 AM - 8:00 PM Pacific Time weekdays or 6:00 AM - 7:00 PM Pacific Time weekends.

You are buying tickets from a third party; neither Website.com nor Website, Inc. is the ticket seller. Ticket prices are set by the seller and may differ from face value. ALL SALES AND BIDS ARE FINAL. No refunds, transaction cancellations or exchanges will be issued for date/time changes or partial performances. Cancelled events will be handled on a case by case basis. All prices listed are in US dollars. Use of this website signifies your agreement to the User Agreement and Privacy Policy.

© 2000-2008 Website, Inc. All rights reserved.

FIGURE 21

SYSTEM AND METHOD FOR PRICING SECONDARY INVENTORY

CROSS-REFERENCES TO RELATED APPLICATIONS

The present application is a continuation in part of and claims priority to U.S. application Ser. No. 14/562,606 filed Dec. 5, 2014, which claims priority to and incorporates by reference, for all purposes, the following provisional application: U.S. Provisional App. 61/912,850, filed Dec. 6, 2013.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Computer systems and networks have facilitated the task of buying, selling, and transferring goods. For example, global computer networks, such as the Internet, have allowed purchasers to quickly and efficiently seek and purchase goods on-line. One example of a market for goods that has been implemented using computer systems and networks is the secondary event ticket market. The secondary ticket market encompasses all instances in which live event tickets trade after the original point of purchase.

The secondary market exists for several reasons. First, the value of event tickets are especially time sensitive with the ticket losing 100% of its value after the event has occurred. As a result, if a ticket holder cannot attend the event, the only way to realize any value for the ticket is to sell the ticket in the secondary market. Second, venues have a fixed supply of seating, so high-demand events have a supply/demand imbalance resulting in tickets with a greater value than the original issue price (e.g. face value). Some ticket holders are willing to sell their tickets for these high demand events thereby realizing a profit based on their original purchase price. Third, many ticket sellers provide season tickets. Some season ticket holders cannot attend one or more of the season's events and the secondary market provides these season tickets holders with a method to resell the tickets for events that they cannot attend.

There are now a number of internet sites that allow ticket holders to resell tickets to others. Examples include StubHub, Razor Gator, and TicketExchange. These sites list the event for which the ticket is valid, the locations of the seat (typically by section, row, and sometimes seat), the number of adjacent seats that are available, and the prices per ticket for each ticket in the listing. Many sites now offer a general view of the venue to facilitate locating the available ticket within the event venue.

Even with the information provided on any given site, it is still very difficult to compare available tickets to determine the best value. Many different factors determine ticket values, not all of which is obvious to an average customer. From the above, it can be seen that improvements to methods and systems related to the sale and distribution of tickets is highly desirable.

BRIEF SUMMARY OF THE INVENTION

Accordingly, the present invention is directed to a method and system for the sale and distribution of goods. More specifically, the present invention is directed to a method and system for determining the optimal ticket for purchase in the original and/or secondary market. In an embodiment, the determining the optimal ticket for purchase can include determining the premium or discount of the tickets for sale in the secondary market, by comparing the discount or premium of each ticket with other tickets from the same price category or section, and determining the value of each ticket relative to similar tickets to the same event. This information can be further weighted based on user inputs such as their price range of interest, the number of tickets that must be together, or a desire to highly weight other ticket attributes (e.g. low row number, proximity to the aisle, etc.).

The present invention is also directed to a method and system for determining the optimal ticket for purchase when considering several events simultaneously. Specifically, the present invention determines the optimal ticket across several events by determining the normalized premium or normalized price for each event that a user wants to compare and then presenting the optimal tickets across all-selected events.

The present invention is also directed to a method and system for dynamically determining the price to sell a ticket such that the ticket will be an optimal ticket for purchase. Specifically, the present invention determines the price of tickets of seats that are similar to the ticket that a seller has to sell and dynamically determines the price that the seller should charge to ensure that the ticket is of best value to a customer.

To achieve these and other advantages, as embodied broadly and described herein, a system and method to determine the optimal ticket in the original and/or secondary market includes means for aggregating information from the electronic ticket market and may include one or more sites on the secondary market and/or one or more sites where original tickets are sold (e.g. a team's website, Ticket Master, etc.). This information may include seat location (e.g. section, row and seat number), number of seats available, price per ticket, ticket identifier, and other pertinent information.

In another aspect, the invention includes s system and method for determining the optimal ticket for purchase. The method includes a means of adding the face value of the ticket to the information from the secondary market where the face value of the ticket could include full price, season ticket price, current retail price, or other original pricing information.

In another aspect, the invention includes a system and method for determining the optimal ticket for purchase. The method includes a means of determining the premium or discount of the tickets in the secondary ticket market and/or original ticket market relative to the face value.

In another aspect, the invention includes a system and method for determining the optimal ticket for purchase. The method includes a means of correlating the premium or discount for tickets in a specific section and/or original ticket price category with the row number thereby identifying tickets that have a price that is lower than other tickets in the same section relative to the row.

In another aspect, the invention includes a system and method for determining the optimal ticket for purchase. The method includes comparing tickets for more than one event where the premium or price for each event is normalized by the average price for the vent and the tickets are then compared to identify tickets with the lower normalized premium or normalized price.

In another aspect, the invention includes a system and method for determining the optimal ticket for purchase. The method includes inputting purchaser preference information such as importance of proximity to the event (i.e. low row number), importance of an aisle seat, importance or a particular side of the venue, importance of a specific section, desire for a parking pass, or similar preference information.

In another aspect, the invention includes a system and method for determining the optimal ticket for purchase. The method includes combining the preference information with the pricing information to provide the best available seat(s) for the purchaser.

Many benefits are recognized through the various embodiments of the present invention described previously and throughout the present specification. Such benefits include a comprehensive and efficient method for determining relative ticket values for specified events or groupings of events, which can be used to provide an easier way for customers to buy tickets and for sellers to sell tickets. Other benefits will be recognized by those of ordinary skill in the art that the mechanisms described can be applied to other communications systems as well.

BRIEF DESCRIPTION OF THE DRAWINGS

The accompanying drawings, which are included to provide further understanding of the invention and are incorporated in and constitute part of the specification, illustrate embodiments of the invention and together with the description serve to explain the principles of the invention. In the drawings:

FIGS. 1A and 1B show a typical web site that sells tickets in the secondary market.

FIG. 5 shows and example of the type of information that is presented to a customer after they select a specific event to attend.

FIG. 6 is an example of a questionnaire that could be used to further refine the optimal seat for purchase based on customer preferences.

FIG. 9 shows an example of the XML text that is used to locate tickets for sale on a selected site according to an embodiment of the present invention.

FIG. 11 shows an example of the type of ticket information that is derived from the secondary ticket market according to an embodiment of the present invention.

FIG. 12 shows an example of secondary tickets where a premium or discount has been calculated according to an embodiment of the present invention.

FIG. 13 shows the tickets listed for one specific section of a venue for one particular event according to an embodiment of the present invention.

FIG. 15 shows all tickets listed for $145 for the same event as the tickets shown in FIGS. 13 and 14 according to an embodiment of the present invention. In this case, the list includes seats in different sections. The premium for each seat is also provided.

FIG. 17 shows the relative value of all $145 tickets when row and section are take into account according to an embodiment of the present invention.

FIG. 18 shows the premium for all tickets with an original price of $15 or $20 and indicates which tickets provide the highest value according to an embodiment of the present invention.

FIG. 19 shows tickets with an original ticket price of $xx according to an embodiment of the present invention.

FIG. 21 shows an example of a web site of a ticket reseller that describes their affiliates program.

DETAILED DESCRIPTION OF THE INVENTION

Figure 2:
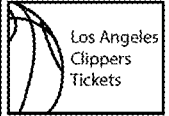
FIG. 2 shows the type of information a user would see on a secondary ticket site after searching for a particular team or performer.

The present invention is directed to a method and system for the sale and distribution of goods. More specifically, the present invention is directed to a method and system for determining the optimal ticket for purchase in the original and/or secondary market. The following description is provided to enable any person skilled in the art to make and use the invention and sets forth the best modes contemplated by the inventor for carrying out the invention. References are now made in detail to best modes of the present invention, examples of which are illustrated in the accompanying drawings.

As described previously, the task of determining the optimal value for a ticket is still very difficult even with the information provided on any given site. Seats within any section often vary significantly in price and many venues have multiple sections that offer similar views that must be manually compared in order to determine the best price. Furthermore, pricing typically varies as the row number increases (i.e. the seat is further away from the field, stage, etc.) and specific preferences such as proximity to an aisle can change pricing and/or desirability. Finding the optimal ticket for sale is even more complicated if one considers the large number of sites that list tickets for original sale and re-sale. Locating the optimal ticket can be even further complicated by different fees, shipping charges, and other costs that sites charge above and beyond listing price.

Furthermore, the optimal ticket may depend on the desires of the purchaser. For instance, one purchaser may be willing to spend a little more to be closer to the event while some other purchaser may want to spend less and be a little further away from the event.

In addition, a purchaser may be flexible as to the exact time, date, or performance that they can attend. For this purchaser, it is helpful to compare tickets across multiple events at the same time so they can choose the best value ticket across multiple events.

Fees and commissions also complicate the determination of best value. Sometimes the base cost of the ticket could seem like a good value, but once fees and commissions are added on, another ticket is actually a better value.

Given the challenges in determining the relative value of tickets in the original and/or secondary market, it is therefore desirable to provide a system and method for identifying the optimal ticket for purchase.

This invention provides a method to determine the optical ticket for purchase. The optimal ticket is determined using software that compares the cost and location of tickets to other tickets being sold for the same event. The software may further take into account other selection criteria provided by the purchaser to determine the optimal ticket given these multiple considerations.

This invention also provides a method for sellers to dynamically change the amount they charge for tickets so that their tickets will be a best value ticket when price and location is considered by a user. This is accomplished by determining the value of other nearby tickets listed for sale and dynamically adjusting the total price of a seller's ticket so that it is lower priced than other tickets offering a similar experience (i.e. location, amenities, etc.).

This invention also provides a method to determine the optimal ticket for purchase across multiple events. For instance, if someone is travelling to New York and wants to see a Broadway play, they may want to find the optimal ticket during the time of their visit and not only the optimal ticket for a specific time. In this case, the optimal ticket can be determined by comparing the normalized premium across multiple events. The premium can be calculated within each individual event and then the average premium for the event can be determined. Then a normalized premium for each ticket for that event can be computed by dividing the individual premiums by the average (or median) premium. The normalized premiums can be compared across more than one event and in this way the best ticket across multiple events can be determined.

It is also possible to determine the optimal ticket across multiple events using the actual ticket price (instead of the premium), but dividing each ticket price in a section by the average price in that section to create a normalized price and then compare the normalized price across multiple events. Finally, it is also possible to determine the price versus row or premium versus row such that the relative value can be determined on a row by row basis within an event and then compared across multiple events.

The present invention includes a method of finding one or more optimal tickets for purchase that allows a consumer interested in obtaining a ticket to an event to easily determine the best available ticket to that event. This greatly simplifies the purchasing process and guarantees a purchaser that they locate the best valued ticket. Further details are provided in the accompanying figures and description below.

FIGS. 1A and 1B show a typical web site that sells tickets in the secondary market. FIG. 1A shows the information around the outer edge of the front page. This information is relatively static in nature. FIG. 1B shows the information in the center of the front page. This information may be changed on a more regular basis.

The first step in determining and optimal ticket price is to determine the target event, that is, the event for which the user wants to purchase tickets. The purchaser can also provide information about the number of tickets that will be purchased. The purchaser would input this information into a web site similar to that depicted in FIGS. 1A and 1B.

FIG. 2 shows the type of information a user would see on a secondary ticket site if the user searches for a particular team or performer. This view provides a list of events that include the chosen team or performer. In this case, the event name, date, venue, and price range are provided along with the option to buy or sell.

Figure 3:
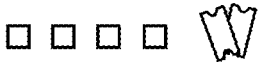
FIG. 3 shows an example of a secondary ticket site once a specific event is selected by the user.

FIG. 3 shows an example of a secondary ticket site once a specific event is selected by the user. Available ticket information is typically presented as a section, row, number of seats available, and the price per ticket. Additional information about any single listing can be obtained by clicking on the "view details" icon.

Figure 4:
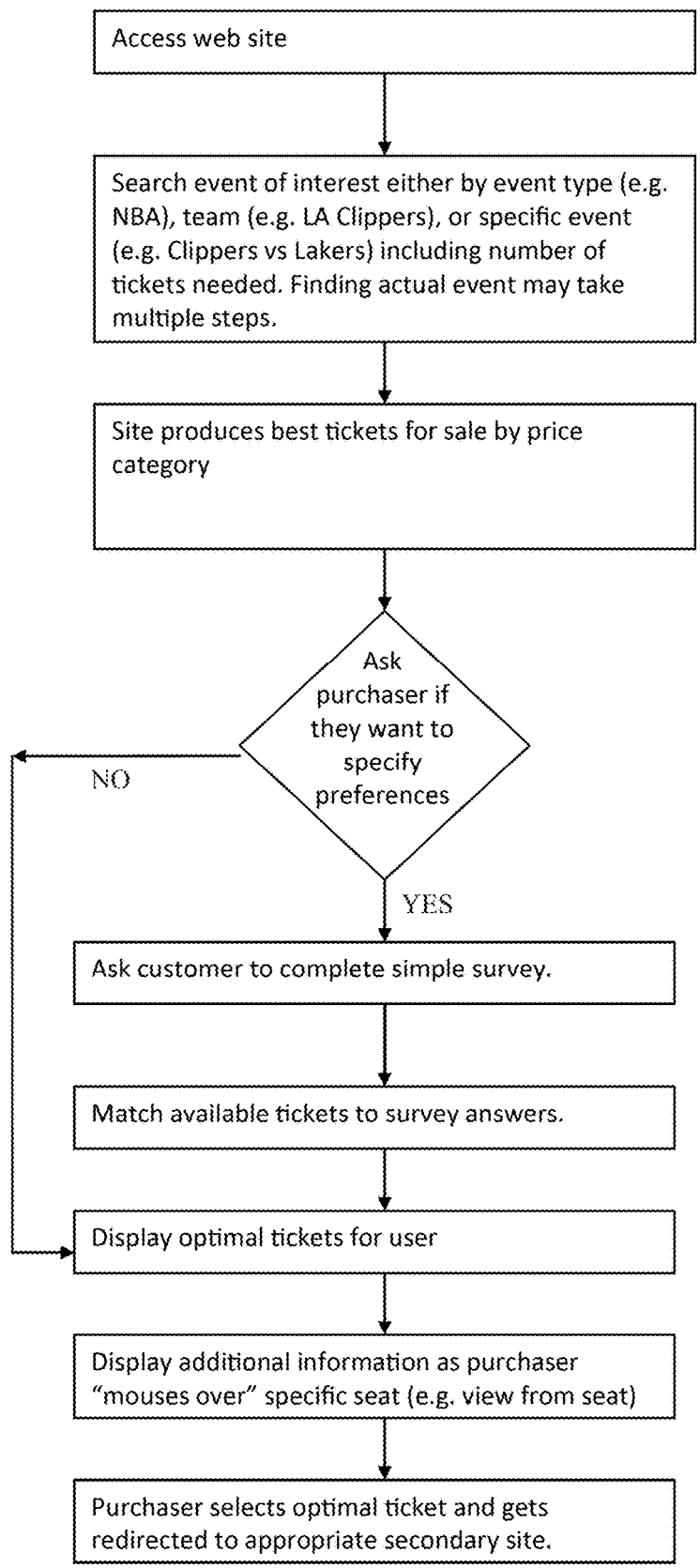
FIG. 4 shows a flow diagram representing a method for identifying an optimal ticket for purchase according to an embodiment of the present invention.

FIG. 4 shows a flow diagram representing a method for identifying an optimal ticket for purchase that would be experienced by a user. Instead of manually comparing available tickets across one or more sites, the software automatically selects the best tickets available. These results can be modified based on user preferences to further reduce the number of optimal tickets. Other variations, modifications, and alternatives will be recognized by those of ordinary skill in the art.

FIG. 5 shows and example of the type of information that is presented to a customer after they select a specific event to attend. The purchaser can mouse over a specific ticket in the list and see it highlighted in the stadium view and may also get a visual image of the view from the chosen seat. Alternatively, the purchaser can mouse over a specific seat in the stadium view and the listing will be highlighted and a view from the seat may be provided. FIG. 6 is an example of a questionnaire that could be used to further refine the optimal seat for purchase based on customer preferences.

The second step of identifying the optimal ticket value is to assemble information about tickets available in the primary and/or secondary markets for the event of interest. This can be done manually or can be accomplished using automated computer software, so called crawling software that retrieves information from one or more public websites accessed via the internet. Examples of the obtainable information available from these kinds of websites are shown in FIGS. 2, 3, and 5. This may be done in real-time (i.e. when the request is made) or may be done automatically on a periodic basis to update and store information in a database.

In addition, computer software can directly access private databases of ticket information if access has been arranged. Such databases can interact with the automated computer software via a plurality of means such as SFTP (Secure File Transfer Protocol), direct SQL client-server interchange, etc. Software access to databases of ticket information is also available via web-based XML interchange and is sponsored by various large ticket resellers under various "affiliate programs". In the following we use the generic term "crawling" to cover any and all of these methods of accessing ticket information from the secondary market.

Figure 7:
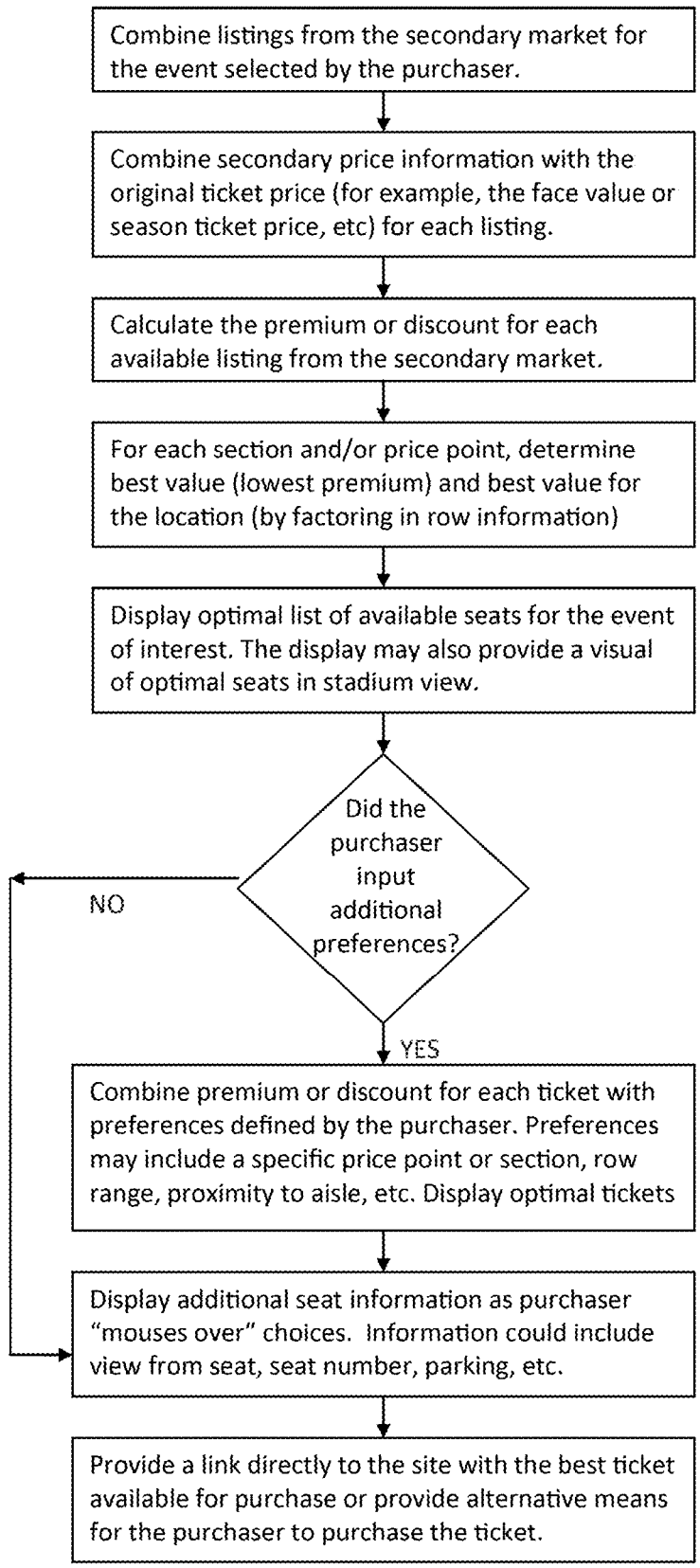
FIG. 7 shows a flow diagram representing a method for identifying an optimal ticket for purchase according to an embodiment of the present invention.
Figure 8:
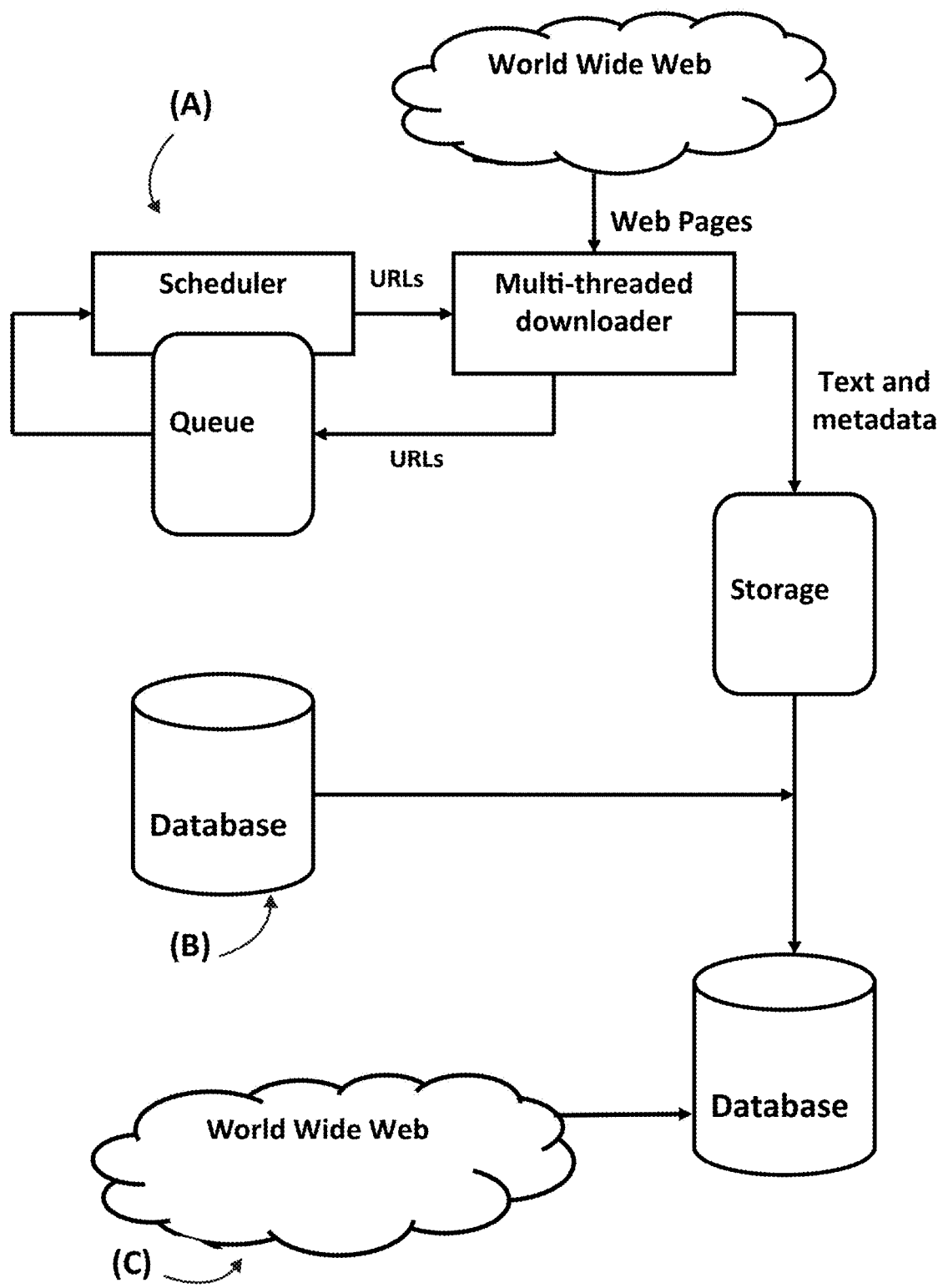
FIG. 8 shows a block diagram representing a system for identifying an optimal ticket for purchase according to an embodiment of the present invention.

FIGS. 7 and 8 depict a method and system for identifying an optimal ticket for purchase according to an embodiment of the present invention. FIG. 7 shows the steps that the software executes to provide information about the optimal ticket to the purchaser while FIG. 8 shows the software flow. (A) is a crawler that searches the web for ticket listings. (B)

is a database that stores pricing information about events. (C) is the web interface that a potential ticket purchaser uses to interface with the ticket data. The can be other variations, modifications, and alternatives as well.

FIG. 9 shows an example of the XML text that is used to locate tickets for sale on a selected site. If internet sites are crawled, the analysis software first assembles a ticket file in native xml code as shown in FIG. 9.

This native xml file is the parsed by the software to extract relevant variables such as Ticket ID, Section, Row, Seat (if available), quantity, price, and other special indicators such as whether or not the seat is an aisle seat etc. The software uses proprietary rules to "understand" the arena seating plan, and relate this to the xml ticket information, which often contains the seating information in free-form English which is not directly parsable. For example, a courtside seat may be annotated "CT", "Court", "Courtside", "Floor", etc. The software has rules and intelligence to uniquely decode these annotations. In this first step of the crawler/parser, the essential parameters of the ticket have been parsed and stored in a ticket object data structure or array. For example, the ticket object may include information related to section, row, row qualifier (e.g. courtside), seat availability, seat qualifier (e.g. aisle), etc.

Figure 10:
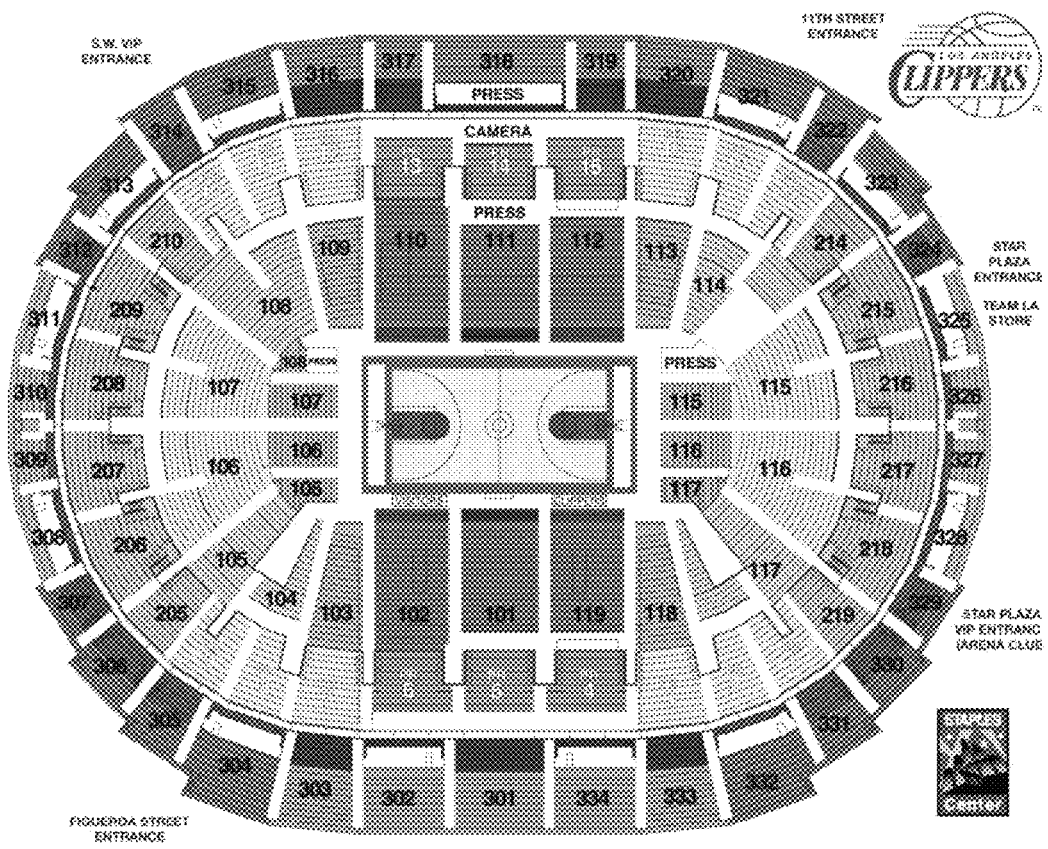
FIG. 10 shows an example of the ticket price data that is used to determine the premium or discount at which tickets are selling for in the secondary ticket market.

FIG. 10 shows an example of the ticket price data that is used to determine the premium or discount at which tickets are selling for in the secondary ticket market.

FIG. 11 shows an example of the type of ticket information that is derived from the secondary ticket market according to an embodiment of the present invention. This information may be supplemented with an identifier that indicates the actual site that produced the information.

The parsed and decoded ticket data is then stored in a database, with annotations on the event ID, game, date etc, to which this refers, in addition to the time and date of the crawling and analysis. An example of this data is shown in FIG. 11. The storage of this information allows subsequent analysis of ticket data over time. The database used may be any one of a number of standard types, such as ORACLE, Microsoft SQL server, etc.

It is also possible to crawl multiple sites, and the software is capable of doing this. Data from multiple sites will be aggregated so that all data for a given event is easily accessible. Sites can include secondary ticket sites such as StubHub or RazorGator, team sites, league sites, original ticket sites such as Ticketmaster, or even other web sites including social networking sites.

The software also relates the ticket price to the "face value" of the ticket (such as the season ticket holder price), which is obtained from other public and private sources. This information is venue dependent, and may be specific event dependent. For example, for a basketball team that plays in one venue that is configured the same for every game, the data is venue dependent but not event dependent. For other events, say a concert, the data may be event dependent because seating may be specific to a particular artist or event.

For each venue/event the "official" ticket pricing is stored in an array with an identical data structure to the above, plus a field for the Price. The price for every unique section, row, etc is stored. The software then searches for a match between the input ticket data structure above, and the stored price structure. If an exact match is found the price is returned. If an exact match is not found then the search fails and an error code is returned.

Generating the array of prices may require complex logic to correctly identify the price. For example the following code (in which the logic is embedded in the code, as opposed to being stored in a table) correctly interprets various complex combinations of Section/Row:

```
if SectionNumber=115 or Section Number=116 then
    if RowString$<>'''' then
        PriceSTH=95
    else
        if RowCTflag=0 and RowNumber<>0 then PriceSTH=50
        if RowCTflag=1 OR CourtsideFlag=1 then
            if RowNumber=1 then PriceSTH=1100
            ifRowNumber=2 then PriceSTH=450
        endif
    endif
endif
```

FIG. 12 shows an example of secondary tickets where a premium or discount has been calculated according to an embodiment of the present invention. In this case, the premium or discount has been calculated relative to the season ticket price (STHPrice).

Once the ticket database is established it may be queried in a number of ways to extract relevant information. For example, a list of the tickets being offered can be combined together with the face value price as shown in FIG. 12. In this case, the premium or discount has been added to the file. This value is calculated by subtracting the face value (or some other original price) from the listed value and dividing the result by the face value (or original price). This calculation could also be done on a periodic basis and stored in a database for retrieval when a user inquires about tickets to a specific event.

FIG. 13 shows the tickets listed for one specific section of a venue for one particular event according to an embodiment of the present invention. In this case, the best value has been highlighted where the best value was determined solely based on the lowest premium.

Figures 14A, 14B:
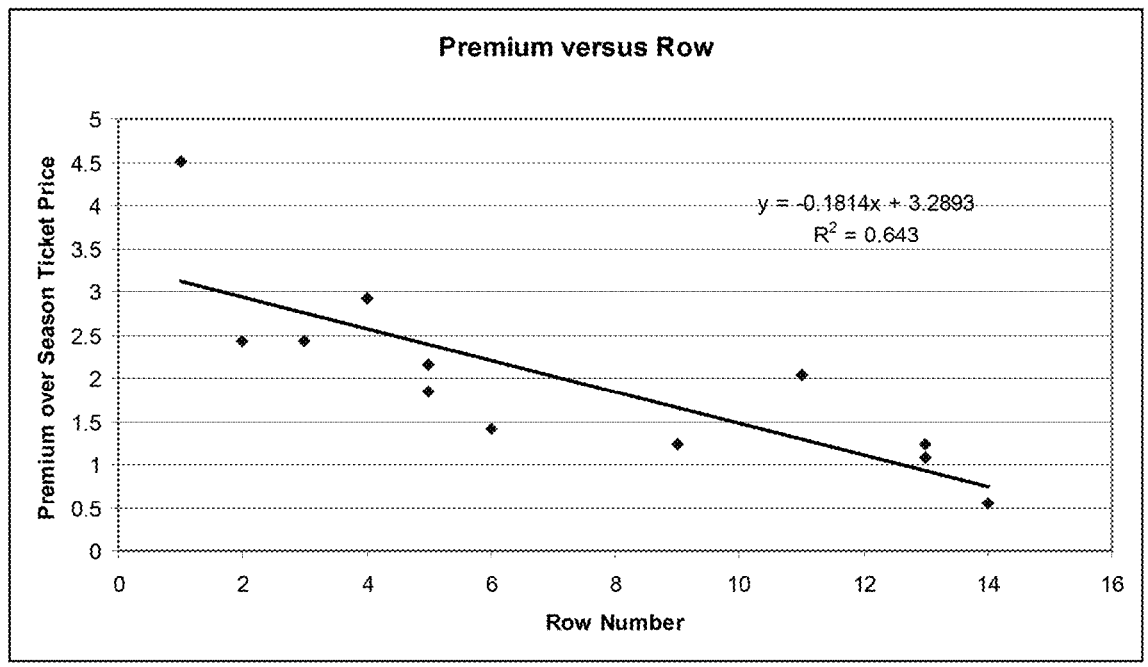
FIGS. 14A and 14B show a graphical analysis and table of the same section as used in FIG. 13, respectively, according to an embodiment of the present invention.

FIGS. 14A and 14B show a graphical analysis and table of the same section as used in FIG. 13, respectively, according to an embodiment of the present invention. In FIG. 14A, premium for all of the seats in section 101 are plotted versus the row number for the particular seat. It can be seen that seats with low row number (i.e. closer to the event) are listed at a higher premium. In FIG. 14B, the tickets are listed along with their premiums. An additional column indicates the value of the ticket when row and premium are considered. It can be seen that the ticket with the best value is different than the ticket with the lowest premium as indicated in FIG. 13.

Once information about available tickets has been aggregated a comparison of ticket value can be determined. This can be done using two different approaches. In the first approach, the premium or discount as described above is used to determine the optimal ticket available for purchase. Since there may be many different original ticket prices within the venue, it is not adequate to just determine the lowest premium or largest discount (since the location of this seat may not match the purchaser's preference). We first parse the tickets based on the original ticket price. We can then determine the lowest premium or largest discount for each ticket in each original ticket price category. This calculation does not take into account the row number for the seat. For most venues, there is a strong dependence on the premium or discount and the row number. In order to improve upon providing simply the lowest premium or largest discount, an analysis of premium/discount versus row number is preformed. An example is shown in FIG. 14. First, the premium/discount versus row number is fitted to a mathematical function. Ideally this fit is a straight line but other fits could be possible. In this case, the fit indicates that, $$Premium = -(0.1814*Row) + 3.2893$$

The deviation from this fit can be calculated for each ticket. For each ticket, the predicted premium can be calculated based on the row number for the ticket. The deviation from the predicted value can be calculated. For example, the fifth ticket in FIG. 14b is in row 6. From the equation above, the predicted premium is, $$Premium_{(predicted)}=-(0.1814*6)+3.2893$$

So, $$Premium_{(predicted)}=2.2009$$

The ticket value can be calculated by comparing the actual premium to the predicted premium, $$Ticket\ Value=Premium_{(predicted)}-Premium_{(actual)}$$

For this ticket, $$Ticket\ Value=2.2009-1.4138=0.7871$$

The best ticket will have the highest ticket value (the lowest actual premium relative to that predicted by the fit for all tickets). This corresponds to the ticket that falls the farthest below the fit in FIG. 14. By comparing the ticket value for all tickets in this manner, the ticket with the best value when row number is considered is determined. Combining the results of this analysis with the analysis above that did not consider row number, we get two tickets for the section that represent the lowest price and the best value. Both of these tickets can be stored for presentation to the purchaser.

This analysis can be further augmented by looking for other tickets that are close in value to the best valued ticket. A threshold can be added that identifies any tickets where their value is within a certain percentage of the ticket with the highest value. For example, if we set this threshold at 5%, then we could calculated a Ticket Value threshold, $$Ticket\ Value\ Threshold=Optimal\ Ticket\ Value-(Optimal\ Ticket\ Value*Threshold\ Percent)$$

$$Ticket\ Value\ Threshold=0.7871-(0.7871*0.05)$$

$$Ticket\ Value\ Threshold=0.7477$$

The rest of the tickets can be analyzed to determine if any other tickets meet this requirement. In this particular case, no other tickets in FIG. 14 meet this ticket value threshold requirement. The threshold percent could be a constant or could be derived from a user input that described how many choices the user would like to see. If the user wants few choices, this variable would be set to a low number. If they would like to see more possibilities, this number could be increased. A setting of zero returns only the original ticket found without the ticket value threshold.

FIG. 15 shows all tickets listed for $145 for the same event as the tickets shown in FIGS. 13 and 14 according to an embodiment of the present invention. In this case, the list includes seats in different sections. The premium for each seat is also provided.

Figure 16:
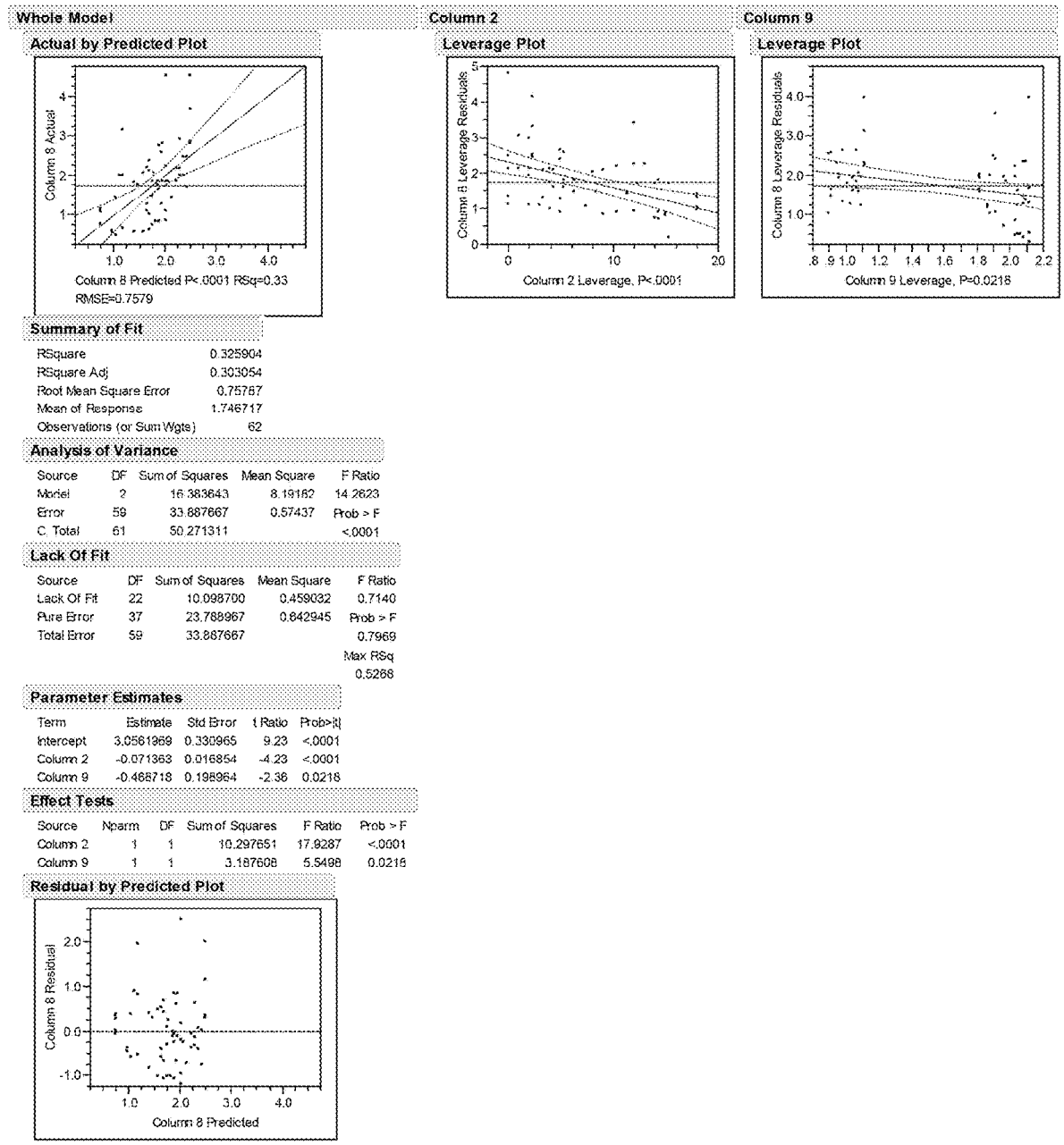
FIG. 16 shows an analysis of the dependency of the premium for all $145 tickets on the section and row number according to an embodiment of the present invention.

FIG. 16 shows an analysis of the dependency of the premium for all $145 tickets on the section and row number according to an embodiment of the present invention. The example shown here uses a linear fit but other fits (e.g. exponential, logarithmic, or polynomial) could also be used.

In some instances there are several sections in an arena at the same original ticket price as shown in FIG. 10. In this case sections 101, 102, 109, 110, 111, and 112 all have the same original ticket price. In some cases, the value of one section may provide enhanced value relative to other sections. For instance, sections 101 and 111 may be considered superior sections since they are more centrally located to the court. In this case, the relative value can be determined as described above using only row number or the premium can be determined using a least squared analysis where row and section are treated as variables. In the latter case, the sections are assigned a separate value based on their location. In this case, sections 101 and 111 are assigned one value (a value of one) and sections 102, 110, 112, and 119 are assigned a second value (two in this case). The fit of premium to row and section can then be calculated. This fit is shown in FIG. 16. This fit can then be used to determine the ticket value as described above.

If no original pricing information is known, the aggregated ticket prices can be compared on a section by section basis since it will not be possible to determine pricing on an original price basis. This may result in more listing than would be provided if the original ticket values were known.

FIG. 17 shows the relative value of all $145 tickets when row and section are take into account according to an embodiment of the present invention.

FIG. 18 shows the premium for all tickets with an original price of $15 or $20 and indicates which tickets provide the highest value according to an embodiment of the present invention. For $20 tickets, two tickets were chosen since they were within 3.5% of each other. The software can be configured to provide only the highest value ticket or the highest value ticket and all others within a certain threshold of that value.

FIG. 19 shows tickets with an original ticket price of $xx according to an embodiment of the present invention. In this case, two tickets were selected as high value. One ticket is in the lower rows (lower than row 8) while the second ticket is in the higher rows (great than or equal to row 8). This shows the ability of the software to be programmed to look for optimal tickets at the lower row number and higher row number within one price point. This provides the purchaser with more purchasing options.

Once a set of tickets are determined to have optimal value, these ticket choices can be displayed to the purchaser through the web site. An example of such a list is shown in FIG. 5. Each optimal seat can also be displayed in a view of the venue. The arena display consists of a file in Scalable Vector Graphics (.svg) format. The file can be produced by proprietary software that takes in the locations of seats from accurate blueprints or drawings of the arena seating and produces the desired file.

A portion of the file is shown below:

```
<?xml version="1.0" encoding="UTF-8" standalone="no"?>
<!-- Created with Inkscape (http://www.inkscape.org/) -->
<svg
    xmlns:dc="http://purl.org/dc/elements/1.1/"
    xmlns:cc="http://web.resource.org/cc/"
    xmlns:rdf="http://www.w3.org/1999/02/22-rdf-syntax-ns#"
    xmlns:svg="http://www.w3.org/2000/svg"
    xmlns="http://www.w3.org/2000/svg"
    xmlns:sodipodi="http://sodipodi.sourceforge.net/DTD/sodipodi-0.dtd"
    xmlns:inkscape="http://www.inkscape.org/namespaces/inkscape"
    id="svg2"
```

-continued

```
        sodipodi:version="0.32"
        inkscape:version="0.45.1"
        width="9600"
        height="7199"
        version="1.0"
        sodipodi:docbase="C:\Documents and Settings\User\Desktop\True View Beginnings"
        sodipodi:docname="Clippers Arena Auto Seat Labeled Backup.svg"
        inkscape:output_extension="org.inkscape.output.svg.inkscape">
    <metadata
        id="metadata7">
        <rdf:RDF>
            <cc:Work
                rdf:about="">
                <dc:format>image/svg+xml</dc:format>
                <dc:type
                    rdf:resource="http://purl.org/dc/dcmitype/StillImage" />
            </cc:Work>
        </rdf:RDF>
    </metadata>
    <defs
        id="defs5" />
    <sodipodi:namedview
        inkscape:window-height="984"
        inkscape:window-width="1680"
        inkscape:pageshadow="2"
        inkscape:pageopacity="0.0"
        guidetolerance="10.0"
        gridtolerance="10.0"
        objecttolerance="10.0"
        borderopacity="1.0"
        bordercolor="#666666"
        pagecolor="#ffffff"
        id="base"
        inkscape:zoom="0.10737602"
        inkscape:cx="4800"
        inkscape:cy="3599.5"
        inkscape:window-x="−4"
        inkscape:window-y="−4"
        inkscape:current-layer="svg2"
        showguides="true"
        inkscape:guide-bbox="true" />
    <rect
        style="fill:gray;fill-opacity:.5"
        id="101CT-A-1"
        width="35.999722"
        height="29.999722"
        x="4349.0815"
        y="−5122.7612"
        rx="7.3107791"
        ry="7.3107786"
        transform="matrix(7.1937329e−3,0.9999741,−0.9999741,7.1937329e−3,0,0)"
        inkscape:label="#101CT-A-1" />
    <rect
        style="fill:gray;fill-opacity:.5"
        id="101CT-A-2"
        width="35.999722"
        height="29.999722"
        x="4348.9063"
        y="−5091.2041"
        rx="7.3107791"
        ry="7.3107786"
        transform="matrix(7.1937323e−3,0.9999741,−0.9999741,7.1937323e−3,0,0)"
        inkscape:label="#101CT-A-2" />
```

The file can be displayed in whole or in part on any browser that is .svg capable. Furthermore, the display can be zoomed in and out to provide local or "global" views of the area of interest of the arena. This enables the user to rapidly compare different ticket offerings from the software.

The portion of the file below shows the data for one seat:

```
<rect
    style="fill:gray;fill-opacity:.5"
    id="101CT-A-1"
    width="35.999722"
    height="29.999722"
    x="4349.0815"
    y="−5122.7612"
    rx="7.3107791"
``` ry="7.3107786"
transform="matrix(7.1937329e-3,0.9999741,-0.9999741,7.1937329e-3,0,0)"
inkscape:label="#101CT-A-1" />

The id of the seat is given in Section-Row-Seat format e.g. 101CT-A-2 above, which is the first seat in the first Courtside row "A" in section 101. Also specified is the location and size of the seat to be drawn.

Figure 20:
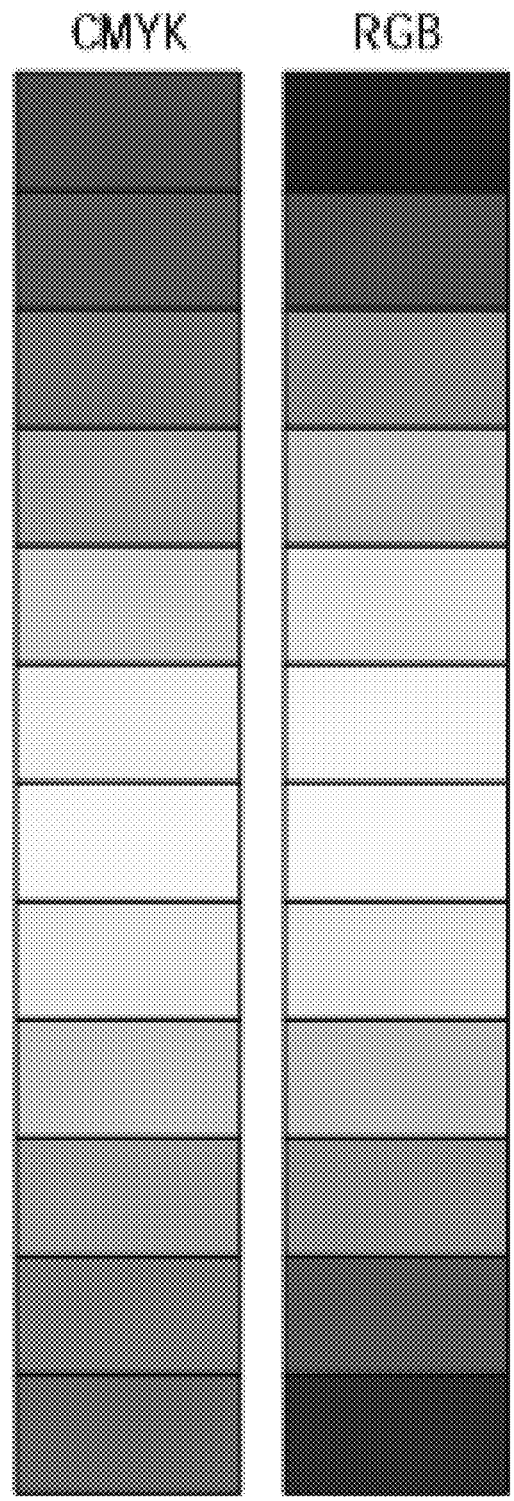
FIG. 20 shows a CMYK color spectrum and an RGB color spectrum according to an embodiment of the present invention.

FIG. 20 shows a CMYK color spectrum and an RGB color spectrum according to an embodiment of the present invention. The color of the seat is given by the code style="fill:gray;fill-opacity:..5". The software can modify the color code so that a wide variety of information can be displayed to the user. For example, seats can be colored to indicate price, value, or closeness to the users preferences. Different color spectrum codings can be used to indicate "hot" or "desirable" to "cool" or "undesirable" as shown in FIG. 20.

The purchaser can then scroll or mouse over a ticket from the list. This will highlight the location within the venue. This can also generate a view from the seat as is shown in FIG. 5. Alternatively, the purchaser can scroll or mouse over a seat within the venue and the seat will be highlighted in the list and a view from the seat can be presented. In this way, it is easy or a purchaser to compare seats available for purchase. It is also possible to show only the venue view and to then presented the specific ticket information as the purchaser scrolls over the seat in the venue view.

Additional data could be presented to help the purchaser with their selection. For instance, the average price or premium for tickets in a specific section or at a particular price point could be provided. This would allow the customer to see the price or premium of the selected seat relative to the price or premium of other similar seats.

It is possible to further reduce the number of choices that a purchaser has by comparing the optimal seats to preferences that the purchaser has provided. One such preference is the number of seats that the customer wishes to purchase. Any ticket listing with a number of seats below the required number could be eliminated reducing the number of choices. Some other possible preferences are listed in the questionnaire in FIG. 6. By having the user complete a questionnaire of this type, the purchaser's preferences can be compared to the list of optimal tickets to further reduce the ticket choices.

The user's preferences in terms of Price, Value, and Location can be incorporated into the selection of seats to offer the user by computing a distance metric M which gives an indication of the closeness of the particular seat offering to the user's stated preferences. This metric can range from 1 (exactly matches the users preference) to 0 (does not match at all). A threshold can then be put on the metric to offered only seats above the threshold.

The overall metric M can be made up of individual metrics for Price, Value, and Location, and others.

For Price, the "distance metric" between the seat price $P_s$ and the desired price $P_d$ can be given by the normalized absolute difference $|P_s-P_d|/P_{max}$. Similarly, for Value the metric could be: $|V_s-V_d|/V_{max}$. For Location the actual distance in seats could be computed using a "city block" distance=seats difference+row difference $|S_s-S_d|/S_{max}$.

These individual metrics can then be weighted by the stated preferences for Price, Value, and Location ($w_p$, $w_v$, $w_s$) to produce the overall Metric M:

$$M = w_p * |P_s-P_d|/P_{max} + w_v * |V_s-V_d|/V_{max} + w_s * |S_s-S_d|/S_{max}$$

Other more complex metrics are possible using pattern recognition techniques. For example, the available seat offerings can be considered to have the "features" or "attributes" of Price, Value, Location, and other parameters. These features form a multi-dimensional feature space that may be non-linear, with the available seats forming points in the feature space. The users preferences can then input into the space and the nearest features (available seats) can be output by the software using a number of Pattern Recognition techniques such as k-nearest neighbors, Support Vector Machines, Fisher Linear Discriminant, Principle Component Analysis, etc. These methods can be used to reduce the number of possible seat choices presented to a purchaser.

Once the purchaser locates the ticket of choice, the user clicks on the listing. Once the purchaser locates the ticket of choice, the user clicks on the listing. If this listing was obtained from a different web site then the user is directed to that website to complete their transaction. In this case, the site completing the transaction would track the referral and pay a commission based on the referral.

FIG. 21 shows an example of a web site of a ticket reseller that describes their affiliates program. Many resellers have formal programs to allow other sites to refer buyers to their sites. Some sites also have special arrangements with large sellers to provide additional means to interact with the secondary reseller's site. Many sites that sell tickets have an affiliates program or other program to facilitate the referral process. An example of a site describing this type of program is shown in FIG. 21.

If the listing came from the same web site as the comparison engine, then the user would be prompted to complete information about the purchase of the ticket. Information such as name, address, email address, phone number, credit card information, etc would be collected so as to complete the purchase process.

In an embodiment, the present invention provides a method for identifying an optimal ticket for purchase. The method can include aggregating available ticket information for a plurality of tickets related to an event criteria, determining a relative ticket value for each ticket from the plurality of tickets from the available ticket information, determining a list of desired tickets from the plurality of tickets meeting a desired criteria using the relative ticket values, and providing the list of desired tickets.

In a specific embodiment, the available ticket information comprises available ticket information from a secondary market or a resale market. The relative ticket values can be either a ticket price or ticket premium that is adjusted for price, location, section, or row number, or other relevant factor. In a specific embodiment, the desired criteria include a lowest relative premium, a largest relative discount, or a desired location, or other user preference.

In a specific embodiment, the event criteria can include a single event or two or more events. Determining the relative ticket value based on these conditions can include the steps of comparing a price or premium of each ticket from the plurality of tickets relative to tickets in the plurality of tickets from a similar location or having a similar price, normalizing the price or premium of each ticket from the plurality of tickets by dividing each price or premium by an average price or average premium to the same event of the two or more events, and comparing the normalized price or normalized premium of each ticket from the plurality of tickets across the two or more events or within the single event.

In a embodiment, the present invention provides computer code product provided in a memory of a computing system programmed to identify an optimal ticket for purchase. The computer code product can include: a code directed to capturing and aggregating available ticket information for a plurality of tickets related to an event criteria, a code directed do determining a relative ticket value for each ticket from the plurality of tickets from the available ticket information, a code directed to determining a list of desired tickets from the plurality of tickets meeting a desired criteria using the relative ticket values, displaying the list of desired tickets on a display of the computing system, and providing a means for a user to purchase a ticket from the list of desired tickets. The other steps described in the above method can also be provided in the computer code product.

In an embodiment, the present invention includes a method for dynamically determining the optimal selling price for a ticket. The method can include aggregating available ticket information for a plurality of tickets related to an event criteria, determining a relative ticket value for each ticket from the plurality of tickets from the available ticket information, determining the lowest relative price or lowest relative premium from the plurality of tickets, and adjusting a price of a seller ticket such that a relative ticket value of the seller ticket is lower than the relative ticket values of similar tickets from the plurality of tickets.

Figure 22:
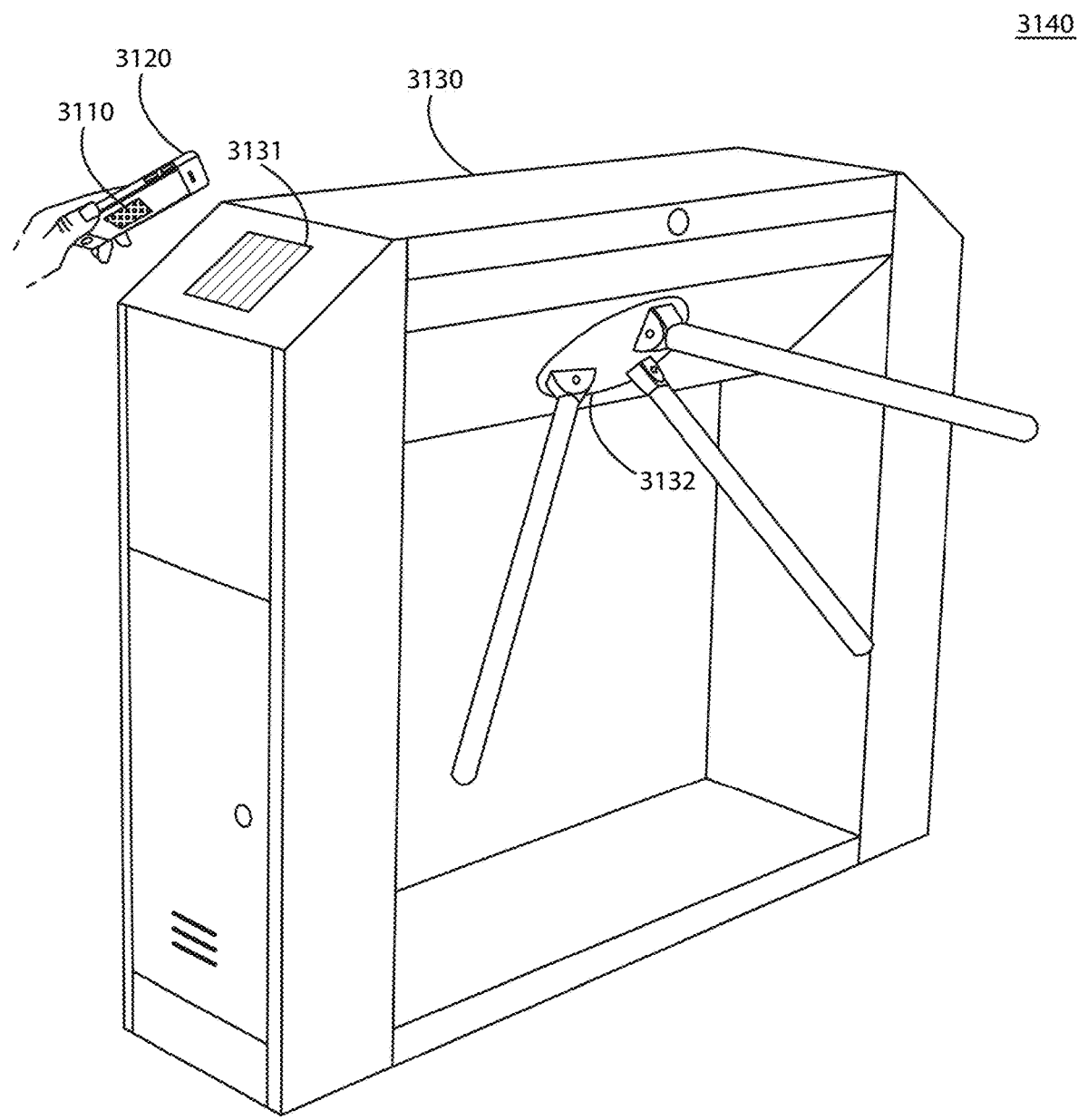
FIG. 22 illustrates a method of using an outputted ticket to access a gate to an event venue in accordance with one embodiment of the present invention.

FIG. 22 illustrates a method of using an outputted ticket to access a gate to an event venue in accordance with one embodiment of the present invention. As shown, a user 3101 can use an outputted ticket 3110 on a mobile device 3120 to access a turnstile gate 3130 to an event venue 3140, or other type of gate, door, or secured entry or exit mechanism. Although the outputted ticket 3110 is shown as a digital QR code shown on the display of the mobile device 3120, the outputted ticket 3110 can also be a physical printed ticket and can also include bar codes, Datamatrix codes, Microsoft "tags," and the like. Here, the turnstile gate 3130 includes a scanner 3131 and a turnstile barrier 3132, the rotating bars, that allows or restricts access in either direction. In this case, when the user scans the outputted ticket 3110 on the turnstile scanner 3131, the outputted ticket 3110 actuates a sensor to initiate the release of a locking mechanism on the turnstile barrier 3132, allowing the user to move through the turnstile gate 3130 to access the event venue 3140. In an alternative example, the gate can open automatically or perform other functions to allow or deny entry of the user with the outputted ticket. In an example, access is denied if the outputted ticket is invalid in some manner, that is, not authorized, or used, or other imperfection, among others. Of course, there can be other variations, modifications, and alternatives.

Figure 23:
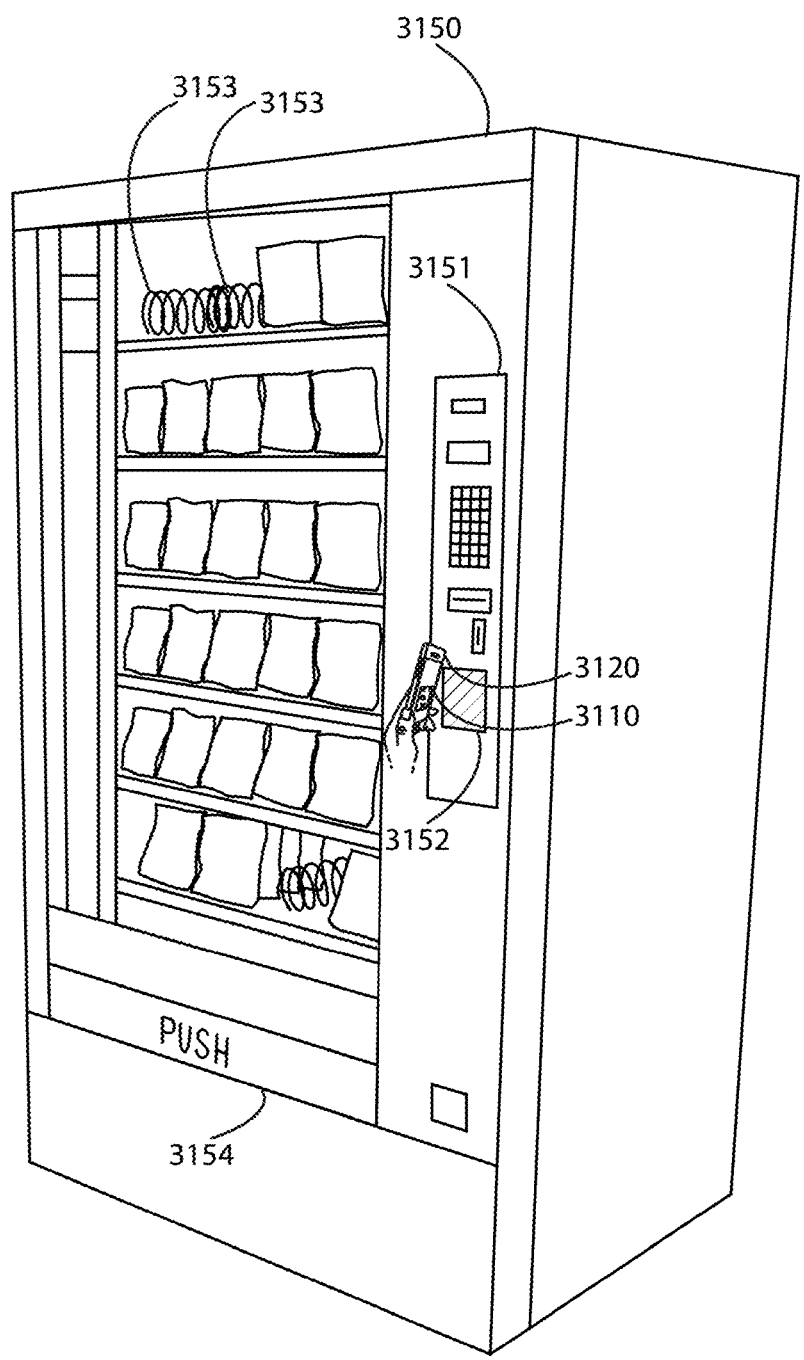
FIG. 23 illustrates a method of using an outputted ticket to access a dispenser within an event venue in accordance with one embodiment of the present invention.

FIG. 23 illustrates a method of using an outputted ticket to access a dispenser within an event venue in accordance with one embodiment of the present invention. As shown, a user 3101 can use the same outputted ticket 3110, as in FIG. 23, to access the selection interface 3151 of a vending machine 3150. The gate structure can be a vending machine interface 3151 that includes a scanner 3152, a plurality of dispensing springs 3153, and a collection slot 3154. The outputted ticket 3110 can unlock the vending machine interface 3151 to provide the user access to the selection of drinks or snacks that are stored on the dispensing springs 3153. Once the user selects a particular drink or snack or other item, the vending machine 3150 dispenses the item for collection by the user. In an example, when the user scans the outputted ticket 3110 on the vending scanner 3151, the outputted ticket 3110 actuates a sensor to initiate the rotating of at least one of the dispensing springs 3153, releasing one of the stored items and dropping the item into the collection slot 3154. Of course, there can be other variations, modifications, and alternatives.

In an example, methods of the present invention can further include outputting at least one the selected tickets as an outputted ticket and initiating an entry process to a gate structure at an event venue associated with the selected tickets. The entry process can include using the outputted ticket to access the gate structure. The gate structure can include an access control gate, a turnstile, a vending machine interface, a gaming machine interface, a room door, a merchandise distribution interface, a parking gate, a locker, or a personal storage unit, or the like. Also, the gate structure can include any other type of gate, door, or secured entry or exit mechanism. In a specific example, the outputted ticket, digital or printed, can be used to unlock or lock a gate structure to deny access or allow entry through the gate structure. In an example, the locking/unlocking mechanism is provided by a device comprising a mechanical latch, a magnetic lock, an electrical lock, or other latch or lock mechanism. The locking/unlocking mechanism can also include a dispensing spring, a movable gate arm, a computer chip, or the like. In the unlock case, the outputted ticket can provide access to receive items such as food, beverages, video games, memorabilia, and the like. The outputted ticket can provide access to enter into a restricted space such as a room, a parking lot, an elevator, and the like. In the lock case, the outputted ticket can provide a means to restrict access to items or spaces, as described previously. Those of ordinary skill in the art will recognize other variations, modifications, and alternatives.

In an example, the gate structure comprises an access control gate, a turnstile, a vending machine interface, a gaming machine interface, a room door, a merchandise distribution interface, a parking gate, a locker, or a personal storage unit. In an example, the entry process uses the ticket to unlock or lock the gate structure, whereupon the unlocking occurs by actuating a sensor to initiate release of a device, comprising a mechanical latch, a movable gate arm, a magnetic lock, or electrical lock, to unlock the gate structure; whereupon the lock occurs by maintaining the device in a locked state to prevent entry through the gate.

In an example, the present invention provides a computer-implemented method for determining a number of open seats to be allocated for sale at a given price for an event during an initial sales period using a ticketing system programmed by a computer readable memory to perform the method. In an example, the method includes one or more or all of the following steps:

providing, by a processor of the ticketing system, a ticketing web interface to a computing device via the Internet using a communications module of the ticketing system;

placing, by the processor, an initial set of a plurality of open seats for sale at a first price via the ticketing web interface using the communications module, the initial set of the plurality of open seats having an initial number of open seats;

storing, by the processor, information associated with the initial set of the plurality of open seats in a first portion of the computer readable memory;

reserving, by the processor, at least one seat within a vicinity to each open seat from the initial set of the plurality of open seats such that each seat within the vicinity to each open seat from the initial set of the plurality of open seats is placed in a hold status, the hold status being not available for sale via the ticketing web interface;

identifying, by the processor, a first number of open seats from the initial set of the plurality of open seats that have been sold or are being considered for purchase via the ticketing web interface using the information associated with the initial set of the plurality of open seats in the first portion of the computer readable memory;

calculating, by the processor, a second number of the plurality of open seats to sell at a determined point in time based on a time dependence of the first number of open seats sold or being considered for purchase;

determining, by the processor, if the initial number of open seats placed for sale at the first price is smaller than the second number of open seats that is calculated to sell, and when it is determined that the second number of open seats projected to sell is greater than the initial number of open seats placed for sale, releasing, by the processor, a first released set of the seats placed in the holding status within the vicinity of each open seat of the initial set of the plurality of open seats for sale at the first price; and outputting, by the processor, the number of seats that have been released to the ticketing web interface using the communications module, wherein the outputting of the number of seats that have been released causes the ticketing system to update the ticketing web interface using the communications module to display on the computing device with the released seats for sale and to enable a user of the computing device to purchase seats for the event from an updated set of seats, including the initial set of the plurality of open sets and the first released set of seats, at the first price following the initial sales period;

outputting to a user a ticket associated with one of the number of seats that have been released; and using the ticket to open a gate structure associated with a venue for the event to allow the user to enter into the venue.

In an example, the present invention provides a computer-implemented method for determining one or more ticket prices for an unsold inventory of tickets to an event at a venue by a ticketing system programmed by a computer memory to perform the method, the method comprising:

aggregating, by a network coupled the ticketing system, a first inventory ticket sales data for the event in a storage of the ticketing system, the first inventory ticket sales data being aggregated from one or more databases coupled to the network, the first inventory ticket sales data including ticket sales data for a first inventory of tickets to the event that are sold within an initial sale time interval starting from a ticket sales starting time for the event;

receiving, by the network, a first status of the first inventory of tickets at a first point in time;

displaying, by a display of the ticketing system, the first status of the first inventory on a venue map of the ticketing system;

receiving, by the network, a second status of the first inventory of tickets at a second point in time;

updating, by the processor, the venue map with the second status of the first inventory;

refreshing, by the processor, the venue map with additional statuses of the first inventory to create a movie of statuses on the venue map;

determining, by a user of the ticketing system, a geographical seating preference history from the movie of statuses on the venue map;

determining, by a processor of the ticketing system, a first rate at which the first inventory of tickets have been sold for the event at the venue using the first inventory ticket sales data;

determining, by the processor, a calculated demand for a second inventory of tickets to the event, the second inventory of tickets including the unsold inventory of tickets to the event, the calculated demand for the second inventory being determined by a demand function using the first rate at which the first inventory of tickets have been sold; and determining, by the processor, the one or more ticket prices for the second inventory of tickets using the calculated demand for the second inventory and the geographical seating preference history;

outputting one of the tickets;

using the ticket that has been outputted to open a gate structure, using an entry process, associated with a venue for the event to allow a user to enter into the venue.

In any of the above examples, transferring one of the desired tickets to a user;

using the ticket that has been outputted to open a gate structure, using an entry process, associated with a venue for the event to allow a user to enter into the venue.

Of course, there can be other variations, modifications, and alternatives.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method providing access to a venue using an optimal ticket, the method comprising:

aggregating available ticket information for a plurality of tickets related to an event criteria, the available ticket information including seat location, a number of available seats, retail ticket price, and price information for a secondary market;

determining a relative ticket value for each ticket from the plurality of tickets from the available ticket information, the relative value including a premium or discount from the secondary market;

determining a list of tickets from the plurality of tickets meeting a criteria using the relative ticket values;

providing the list of tickets;

transferring one of the tickets to a user;

using the ticket that has been transferred to mechanically actuate a gate structure, using an entry process, associated with the venue for the event to allow a user to enter into the venue, wherein determining the relative ticket value includes determining a fit model for tickets in a row based on prices of other tickets in different rows of the same section for the same event, and the relative ticket value for each ticket is based at least in part on applying the fit model to the respective ticket, and wherein providing the list of tickets comprises:

identifying a ticket with a highest relative value, receiving an indication of a threshold percentage from the user, identifying all close-in-value tickets having respective relative values within the threshold percentage of the highest relative value, and presenting, to the user, the ticket with the highest relative value along with all the close-in-value tickets, and presenting secondary market prices for the ticket with the highest relative value and all the close-in-value tickets.

2. The method of claim 1 wherein the criteria comprises a lowest relative premium, a largest relative discount, or a desired location.

3. The method of claim 1 wherein the event criteria comprises a single event, and wherein determining the relative ticket value comprises:

comparing a price or premium of each ticket from the plurality of tickets to the rest of the plurality of tickets;

normalizing the price or premium of each ticket from the plurality of tickets by dividing each price or premium by an average price or average premium; and comparing the normalized price or normalized premium of each ticket from the plurality of tickets.

4. The method of claim 1 wherein the event criteria comprises two or more events, and wherein determining the relative ticket value comprises:

comparing a price or premium of each ticket from the plurality of tickets relative to tickets in the plurality of tickets from a similar location or having a similar price;

normalizing the price or premium of each ticket from the plurality of tickets by dividing each price or premium by an average price or average premium to the same event of the two or more events; and comparing the normalized price or normalized premium of each ticket from the plurality of tickets across the two or more events.

5. The method of claim 1 being implemented in computer system having a memory, processor, and display;

wherein the memory comprises code directed to the method; and wherein the list of tickets is displayed on the display.

6. A non-transitory computer readable media including computer readable instructions that when executed by a computer cause the computer to perform steps comprising:

aggregating available ticket information for a plurality of tickets related to an event criteria, the available ticket information including seat location, a number of available seats, retail ticket price, and price information for a secondary market;

determining a relative ticket value for each ticket from the plurality of tickets from the available ticket information, the relative value including a premium or discount from the secondary market;

determining a list of tickets from the plurality of tickets meeting a criteria using the relative ticket values;

providing the list of tickets;

transferring one of the tickets to a user;

using the ticket that has been transferred to mechanically actuate a gate structure, using an entry process, associated with the venue for the event to allow a user to enter into the venue, wherein determining the relative ticket value includes determining a fit model for tickets in a row based on prices of other tickets in different rows of the same section for the same event, and the relative ticket value for each ticket is based at least in part on applying the fit model to the respective ticket, and wherein providing the list of tickets comprises:

identifying a ticket with a highest relative value, receiving an indication of a threshold percentage from the user, identifying all close-in-value tickets having respective relative values within the threshold percentage of the highest relative value, and presenting, to the user, the ticket with the highest relative value along with all the close-in-value tickets, and presenting secondary market prices for the ticket with the highest relative value and all the close-in-value tickets.

7. The non-transitory computer readable media of claim 6, wherein the criteria comprises a lowest relative premium, a largest relative discount, or a desired location.

8. The non-transitory computer readable media of claim 6, wherein the event criteria comprises a single event, and wherein determining the relative ticket value comprises:

comparing a price or premium of each ticket from the plurality of tickets to the rest of the plurality of tickets;

normalizing the price or premium of each ticket from the plurality of tickets by dividing each price or premium by an average price or average premium; and comparing the normalized price or normalized premium of each ticket from the plurality of tickets.

9. The non-transitory computer readable media of claim 6, wherein the event criteria comprises two or more events, and wherein determining the relative ticket value comprises:

comparing a price or premium of each ticket from the plurality of tickets relative to tickets in the plurality of tickets from a similar location or having a similar price;

normalizing the price or premium of each ticket from the plurality of tickets by dividing each price or premium by an average price or average premium to the same event of the two or more events; and comparing the normalized price or normalized premium of each ticket from the plurality of tickets across the two or more events.

10. The non-transitory computer readable media of claim 6, wherein the list of tickets is displayed on a display.

* * * * *